(12) United States Patent
Mei et al.

(10) Patent No.: US 9,961,499 B2
(45) Date of Patent: May 1, 2018

(54) MOBILE DEVICE REMINDER/CONTROLLER SYSTEM

(71) Applicant: Cyber Group USA Inc., Forest Hills, NY (US)

(72) Inventors: David Mei, Forest Hills, NY (US); Jin-Xia Bao, Forest Hills, NY (US); Eric Mei, Forest Hills, NY (US)

(73) Assignee: Cyber Group USA Inc., Forest Hills, NY (US)

( * ) Notice: Subject to any disclaimer, the term of this patent is extended or adjusted under 35 U.S.C. 154(b) by 3 days.

(21) Appl. No.: 15/471,600

(22) Filed: Mar. 28, 2017

(65) Prior Publication Data

US 2018/0007509 A1    Jan. 4, 2018

Related U.S. Application Data

(60) Provisional application No. 62/493,337, filed on Jun. 29, 2016.

(51) Int. Cl.

| | |
|---|---|
| *H04W 24/00* | (2009.01) |
| *H04W 4/02* | (2018.01) |
| *H04W 68/04* | (2009.01) |
| *H04L 12/26* | (2006.01) |
| *H04B 17/318* | (2015.01) |
| *H04B 1/3827* | (2015.01) |

(52) U.S. Cl.
CPC ............ *H04W 4/023* (2013.01); *H04B 1/385* (2013.01); *H04B 17/318* (2015.01); *H04L 43/16* (2013.01); *H04W 68/04* (2013.01)

(58) Field of Classification Search
CPC ............................... H04W 4/023; H04B 1/385
USPC .................................................. 455/457, 41.2
See application file for complete search history.

(56) References Cited

U.S. PATENT DOCUMENTS

| | | | |
|---|---|---|---|
| 8,014,791 B2 | 9/2011 | Guigné et al. | |
| 8,416,073 B1 | 4/2013 | Scofield et al. | |
| 8,537,003 B2 | 9/2013 | Khachaturov et al. | |
| 8,805,404 B1* | 8/2014 | Yang | H04W 4/02 455/456.1 |
| 8,892,128 B2 | 11/2014 | Gehrke et al. | |
| 9,414,198 B2 | 8/2016 | Forstall et al. | |
| 2006/0199534 A1* | 9/2006 | Smith | G08B 21/023 455/41.2 |
| 2014/0266710 A1* | 9/2014 | Nguyen | H04M 1/00 340/539.13 |

* cited by examiner

*Primary Examiner* — Charles Shedrick
(74) *Attorney, Agent, or Firm* — Collard & Roe, P.C.

(57) ABSTRACT

A mobile device management system includes a mobile device, a locator unit, and an operation unit. The locator unit includes a transmitter and is disposed on or in the mobile device. The operation unit is configured to receive the wireless signal. The units are configured to determine a distance between the locator unit and the operation unit and to cause a notification device to perform a notification when the distance is greater than a threshold signal strength value. The mobile device can also be configured to send a wireless signal to the locator unit when the mobile device receives a call or a message. The operation unit can be used to control the mobile device. A method using the system can help a person remember to retrieve the mobile device, to know to pick up a phone call, or to control a mobile device remotely.

17 Claims, 16 Drawing Sheets

MOBILE DEVICE REMINDER/CONTROLLER SYSTEM

CROSS REFERENCE TO RELATED APPLICATIONS

Applicant claims priority under 35 U.S.C. 119(e) to U.S. provisional patent application 62/493,337 filed Jun. 29, 2016, the disclosure of which is herein incorporated by reference.

BACKGROUND OF THE INVENTION

1. Field of the Invention

Mobile devices, such as cellular phones or remote controllers, are becoming our most reliable items for daily life and work, for mobile convenience, and for networking with the whole world.

2. The Prior Art

Because mobile devices are hands free, it is easy to forget where our mobile devices are left or lost and it is easy to miss incoming calls, emails, and messages. It happens every day that when we walk out of the home or the office, we eventually find out that our mobile device is not with us. We have to go back to find our mobile devices and to see what phone calls we missed. In a noisy environment, we cannot hear the rings from the cellular phone call, and we miss incoming calls. There is a need to solve those problems.

Apple Inc. has developed a function called "Find My iPhone®". Using this function, it is convenient to find and locate a missing iPhone®. This function "Find My iPhone®" does not, however, solve the problem of people forgetting to take their mobile devices with them at all times and leaving their mobile device behind. In other words, for the Apple "Find My iPhone®" function, there is no function to prevent and notify or remind a person that he or she has forgotten the mobile device.

Actually, there is no product yet in the entire market, study, or search area that helps remind users to not forget their mobile device.

There are many systems and methods for giving reminders, but these systems and methods are not for preventing people from forgetting their mobile devices and are not for notifying people of incoming calls, emails, and messages.

Apple Inc.'s U.S. Pat. No. 9,414,198 is directed to a "Location-Aware Mobile Device". With this device and method, one or more location-based clients can be activated on a mobile device for providing location-based services. This device and this method were not developed to recognize and remind a user if he or she left the mobile device behind.

U.S. Pat. No. 8,892,128 discloses a system and method for "Location Based Geo-Reminders" which use a location based geo-reminder physical server. This system and this method are still for location services only and do not help prevent a person from leaving behind the mobile device.

U.S. Pat. No. 8,537,003 to Microsoft Corporation is for a technology for "Geographic Reminders". The technology includes a mobile device with an alarm of a reminder that includes a reference to target-related information. The reminder given is associated with a target and a current location of the mobile device. Once the mobile device is close to that target, the reminder of the mobile device is output as an alarm. This reminder technology does not solve the problem of notifying or reminding the user if his mobile device is left behind or lost.

Amazon Technologies, Inc. has U.S. Pat. No. 8,416,073 for "Location Aware Reminders" which includes a device that is configured to generate its geographic location using a position system. This system and this method do not remind or notify a person if he or she has left his or her mobile device behind and does not notify a person if he or she has missed or is presently missing an incoming call.

Generally speaking, there is a need to develop a new method or system to remind or help users to not leave their mobile devices behind and to not miss incoming calls, emails, reminder alarms, clock alarms, and messages.

SUMMARY OF THE INVENTION

The present invention provides a mobile device reminder/controller system with a wireless signal sender/locator unit, a wireless signal operation unit, and a mobile device which work together for reminding and controlling the mobile device's locations, distances, directions, functions, and operations simultaneously and synchronously.

The wireless signal sender/locator unit sends its wireless signals out with certain wireless signal wave strength arrangements or levels. The wireless signal operation unit receives, senses, or detects the wireless signals and wireless signal wave strength arrangements that are sent from the wireless signal sender/locator unit. The mobile device is fastened with the wireless signal sender/locator unit together. When the wireless signal operation unit senses and detects the wireless signal wave strength arrangements at certain levels that are sent from the wireless signal sender/locator unit fastened with the mobile device together, the wireless signal operation unit starts the alarm (e.g. beeping, a voice message, a shock, a vibration, or a light) to remind a user that his or her mobile device has been left behind beyond a certain distance or direction, such as at a 10 or 15 meter range and location.

In other words, the mobile device reminder/controller system is to alarm and remind a user to not forget or leave his or her mobile device behind. When a user leaves his mobile device behind at a certain distance, the signal operation unit senses and detects a wireless signal wave change (which becomes weaker and weaker at increasing distances) that is being sent from the signal sender/locator unit that has a physical connection to the mobile device unit. At a certain wireless signal strength level preset by the user, the signal operation unit sends out an alarm and warning, preferably a beeping or a voice sound but also can be a light sign or a vibration sign, to remind the user that the mobile device was left behind or where or what situation or operation status the mobile device is in or has.

In a method for object management according to the invention, a wireless signal is emitted via a transmitter of a locator unit. The locator unit is connected to or disposed in an object. Via a receiver of an operation unit, the wireless signal is received. A processor uses the wireless signal to determine a distance between the locator unit and the operation unit. An operation CPU unit of the operation unit compares the distance with a threshold distance value stored in a memory unit of the operation unit. The operation CPU unit causes a notification device of the operation unit to perform a first notification when the distance exceeds the threshold distance. After receiving the reminder signal, the user, a robot, a helper, or an assistant to the person retrieves the object for the user.

Another aspect of the invention includes a mobile device management system that includes a mobile device, a locator unit, and an operation unit. The locator unit includes a transmitter. The transmitter is configured to transmit a wireless signal. The locator unit is configured to be disposed on or in the mobile device. The operation unit includes a receiver, an operation CPU unit, a memory unit, a sensor unit, and a notification device. The memory unit stores a threshold signal strength value. The receiver is configured to receive the wireless signal. The sensor unit is configured to determine a signal strength of the wireless signal received by the receiver. The operation CPU unit is programmed to compare the signal strength with the threshold signal strength value stored in the memory unit. The operation CPU unit is programmed to cause the notification device to perform a notification when the signal strength value becomes lower than the threshold signal strength value.

A user's mobile device is fastened with the wireless signal sender/locator unit through a physical connection, such as a tie, chain, rope, clip, hook, or any kind of fastener.

The mobile device may contain an attachment unit to attach or detach the wireless signal sender/locator unit directly on the back side of the mobile device or at the back side of one shell unit to hold up and protect the mobile device.

When the system is in use, the mobile device is typically fastened with the wireless signal sender/locator together. Therefore, a user can easily be alarmed and reminded so that he can return and retrieve the mobile device that was left behind. The alarm or reminder starts to catch the user's attention once the wireless signal sender/locator unit is sensed and detected by the wireless signal operation unit at a certain distance.

There is a wireless connection and communication between the wireless signal sender/locator unit and wireless signal operation unit. The wireless connection and communication can be one way, two ways, or multiple ways and directions between the wireless signal sender/locator unit and the wireless signal operation unit. Therefore, the wireless signal sender/locator unit and the wireless signal operation unit can work together through the wireless connection and communication.

The wireless signal sender/locator unit includes, for example, a shell unit with top and bottom parts, a wireless signal sender unit, a speaker/sound unit, a sensor unit, a signal receiver unit, a circuit board with microchip, a battery unit, a display unit, a switch unit, a memory unit, a microphone unit, a CPU unit, and a fastening bar unit.

The basic function of the wireless signal sender/locator unit is to send the wireless signals and to remain fastened together with the mobile device.

The wireless signal operation unit includes, for example, a shell unit with top and bottom parts, a wireless signal receiver unit, a speaker/sound unit, a wireless sensor unit, a wireless signal sender unit, a circuit board with microchip, a battery unit, a display unit, a switch unit, a memory unit, a microphone unit, and a CPU unit with microchip and SIM card unit if needed.

The basic function of the wireless signal operation unit is to receive, sense, detect, and process the wireless signals that are sent from the wireless signal sender/locator unit to alarm and remind the user so that he or she does not forget and leave his or her mobile device behind and/or to notify the user of missed incoming calls, emails, reminder alarms, clock alarms, or messages.

The mobile device includes, for example, a shell unit with top and bottom parts, a wireless signal receiver unit, a speaker/sound unit, a wireless sensor unit, a wireless signal sender unit, a circuit board with microchip, a battery unit, a display unit, a switch unit, a memory unit, a microphone unit, a CPU unit with microchip, a fastening bar unit, and a SIM card unit.

The mobile device can be any kind of a mobile electrical device, unit, set, or group or multiple units, sets, or groups of these, and is preferably a cellular phone or a mobile communication unit.

Another embodiment of the invention includes a mobile device management system that includes a mobile device, a locator unit, and an operation unit. The mobile device includes a mobile device transmitter and a mobile device CPU unit. The mobile device CPU unit is configured to cause the mobile device transmitter to transmit a notification signal as a first wireless signal when the mobile device receives a message. The locator unit includes a transmitter. The locator unit is configured to send a reminder signal as a second wireless signal via the transmitter. The locator unit is configured to be connected to or disposed in the mobile device. The operation unit includes an operation CPU unit, an operation memory unit, a receiver, a sensor unit, and a notification device. The receiver is configured to receive the notification signal and the reminder signal. A threshold distance value is stored in the operation memory unit. The operation CPU unit is configured to use the reminder signal to determine a distance between the locator unit and the operation unit. The operation CPU unit is configured to compare the distance with the threshold distance value and to cause the notification device to perform a first notification when the distance exceeds the threshold distance value. The sensor unit is configured to recognize the notification signal after the receiver receives the notification signal. The operation CPU unit is configured to cause the notification device to perform a second notification when the sensor unit recognizes the notification signal.

Furthermore, the object to be managed can be any kind of a moving object or a mobile object, such as a baby, a little child, an old person, a sick person, a disabled person, an animal, a bicycle, a car, a sport item, a robot, a flying object, an underwater object, etc.

In one aspect, the wireless signal sender/locator unit and wireless signal operation unit can be switched or replaced with each other.

There are physical and wireless signal connections and communications that occur amongst the wireless signal locator unit, the wireless signal operation unit, and the mobile device. These connections and communications help a user to find and know where the mobile device is, the distance of the mobile device from the user, and the direction of the mobile device and the signal sender/locator unit at the same time, because the mobile device is physically connected to the signal sender/locator unit and because of the wireless signal connections and communications among the wireless signal sender unit, the wireless signal operation unit, and the mobile device.

Also, the signal sender/locator unit can be installed inside the mobile device. In that embodiment, the wireless signal operation unit and the mobile device work together directly.

There are more advanced functions for the mobile device reminder/controller system. The mobile device reminder/controller system is not only to be a reminder and a locator, but also to perform other functions such as: indicating distance, direction, and/or situation and to function and operate in running. Furthermore, there are more intelligent functions for the system such as auto recording and previewing data, and analyzing and processing whether all units are in a safe mode or in an intelligent mode to remind or alarm the user, such as if one unit is in a dark area, a light area, an unsafe area, an unsafe condition, or a rain area or is in a moving or staying situation. The system can provide suggestions of how many selections to choose from and the best selection and action, or can automatically turn off, switch off, close, operate automatically, perform an automatic command, or automatically control the mobile device for the user's safety and interest.

Another group of other embodiments include the wireless signal operation unit and the mobile device. The mobile device includes the wireless signal sender/locator unit inside.

There may be a plug-in/out structure unit designed on the mobile device so that the wireless signal sender/locator unit is attachable and detachable therewith as a modular assembly method.

In a further embodiment, the signal operation unit is used as a mini remote unit to control the mobile device. More importantly, the signal operation unit is intelligently used further as a remote control and command center to control, command, or operate an on/off switch, to control a group of mobile devices, to receive phone calls, emails, or messages, to verify a password or any ID match, to operate as a security alarm, for safety functions, message functions, picture functions, financial functions, payment functions, personal or work functions, social network functions, internet, wireless, satellite or cell phone communication functions of the mobile device and signal operation unit in one way, two ways, or multiple ways, with remote or wireless connections and communication methods, simultaneously and synchronously.

The mini remote unit becomes a mini cellular phone as a twin set of the mobile device. In that embodiment, the mobile device works with the wireless signal operation unit/mini remote unit together for intelligent operation and as a control system with, for example, communication, intelligent works, an intelligent home network, intelligent financial works, an intelligent ID system, entertainment of games, videos, or music playing, sports, internet network, satellite network, GPS, transportation, travels, for a health network, education, AI/VR/MR/Holography, or a robot system, etc.

The mobile device becomes an Individual Personal Center working with the wireless signal operation unit as a key or a mini control unit. All mobile devices form a mobile world.

There is an App system for the mobile device reminder/controller system for intelligent functions.

In short, the present invention provides a system to remind or help users to not leave their mobile devices behind or to not miss incoming calls, emails, reminder alarms, clock alarms, and messages.

An object of the present invention is to provide a system to notify and remind a user to not forget and leave his or her mobile device behind.

Yet another object of the present invention is to provide a system that includes a wireless signal sender/locator unit, a wireless signal operation unit, and a mobile device that work together simultaneously and synchronously.

Another object of the present invention is to provide a system to remind a user that he or she does not have his or her mobile device and to not let him or her forget and leave behind the mobile device. When the person receives the signal, the person is reminded to return and retrieve the mobile device.

Yet another object of the present invention is that the wireless signal sender/locator unit is physically fastened with the mobile device and is wirelessly connected together with the wireless signal operation unit.

Another object of the present invention is to provide a system to not only remind and locate the mobile device, but to also control the mobile device simultaneously and synchronously.

Yet another object of the present invention is that the wireless signal sender/locator unit and the wireless signal operation unit can be designed or can function as any kind of decoration item and/or wearable item.

Another object of the present invention is that the wireless signal operation unit and the wireless signal sender/locator unit can be used to remind a user of incoming calls, emails, reminder/clock alarms, and messages.

Yet another object of the present invention is that the wireless signal operation unit has a display unit to show wireless signal levels, battery levels, reminder/clock alarms, and phone calls, emails, or messages of the mobile device and/or of the wireless signal operation unit.

Another object of the present invention is that the wireless signal operation unit and the mobile device control and operate each other directly for more functions and effects simultaneously and synchronously.

Yet another object of the present invention is that the wireless signal operation unit becomes a mini remote unit to work with the mobile device. The mini remote unit has all of the functions above plus more communication functions for cellular phone calls, emails, messages, etc. The mini remote unit becomes a twin set of the mobile device, is lightweight, is easy to carry, and works with safer wireless signal waves for health safety.

Another object of the present invention is to provide a system with more intelligent functions for the wireless signal unit and the mobile device working together simultaneously and synchronously.

Yet another object of the present invention is to provide a system for mobile device reminding and control with Apps that are designed and function to remind and control the mobile device and wireless signal operation unit to work together simultaneously and synchronously.

BRIEF DESCRIPTION OF THE DRAWINGS

Other objects and features of the present invention will become apparent from the following detailed description considered in connection with the accompanying drawings. It should be understood, however, that the drawings are designed for the purpose of illustration only and not as a definition of the limits of the invention.

In the drawings, similar reference characters denote similar elements throughout the several views.

FIG. 1CC is a chart of wireless signal waves for another work system, method, or embodiment in accordance with the invention.

DETAILED DESCRIPTION OF THE PREFERRED EMBODIMENTS

Figure 8:
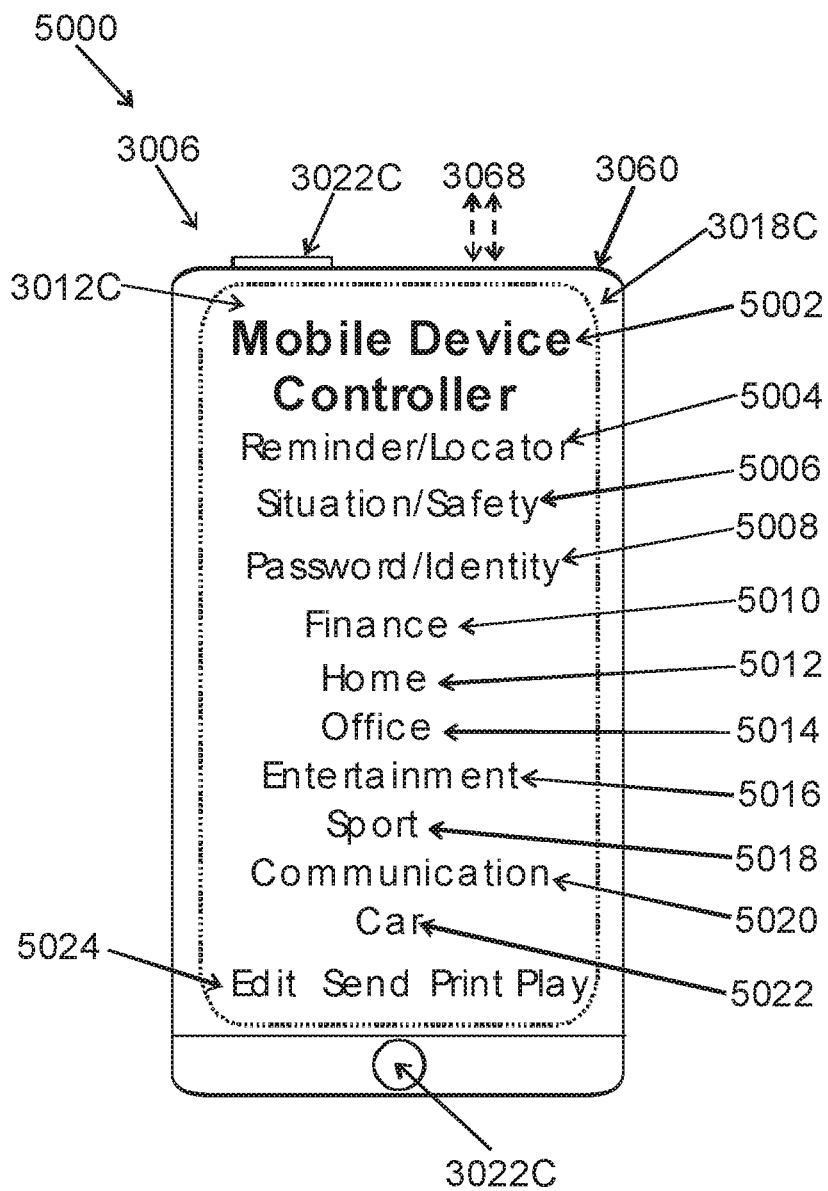
FIG. 8 is a front view of another embodiment in accordance with the invention.

FIGS. 1 to 4 show a mobile device reminder/controller system 2000 which includes a mobile device 2006, a wireless signal sender/locator unit 2002, and a wireless signal operation unit 2004. These components can include related Apps 5000 if needed as shown in FIG. 8. The wireless signal sender/locator unit 2002 is to locate the mobile device 2006 with a physical connection method 2002AB to the mobile device 2006. The wireless signal sender/locator 2002 may be independent or may be included inside of the mobile device 2006. The wireless signal operation unit 2004 receives, senses, processes, and contains a wireless signal connection with the signal sender/locator 2002 in order to detect a location, a distance, a direction, a situation, and a reminder of where the wireless signal sender/locator unit 2002 is which is fastened to the mobile device 2006 or installed inside the mobile device 2006. Therefore, a user can use this system 2000 to be automatically and intelligently reminded of where his or her mobile device 2006 is, how far away it is, what situation and function it or he or she is in, so that the user is reminded to not leave the mobile device 2006 behind. Furthermore, the mobile device reminder/controller system 2000/3000 has more intelligent sense and control functions of the location, situation, and operation of the mobile device 2006/3006.

Figure 1A:
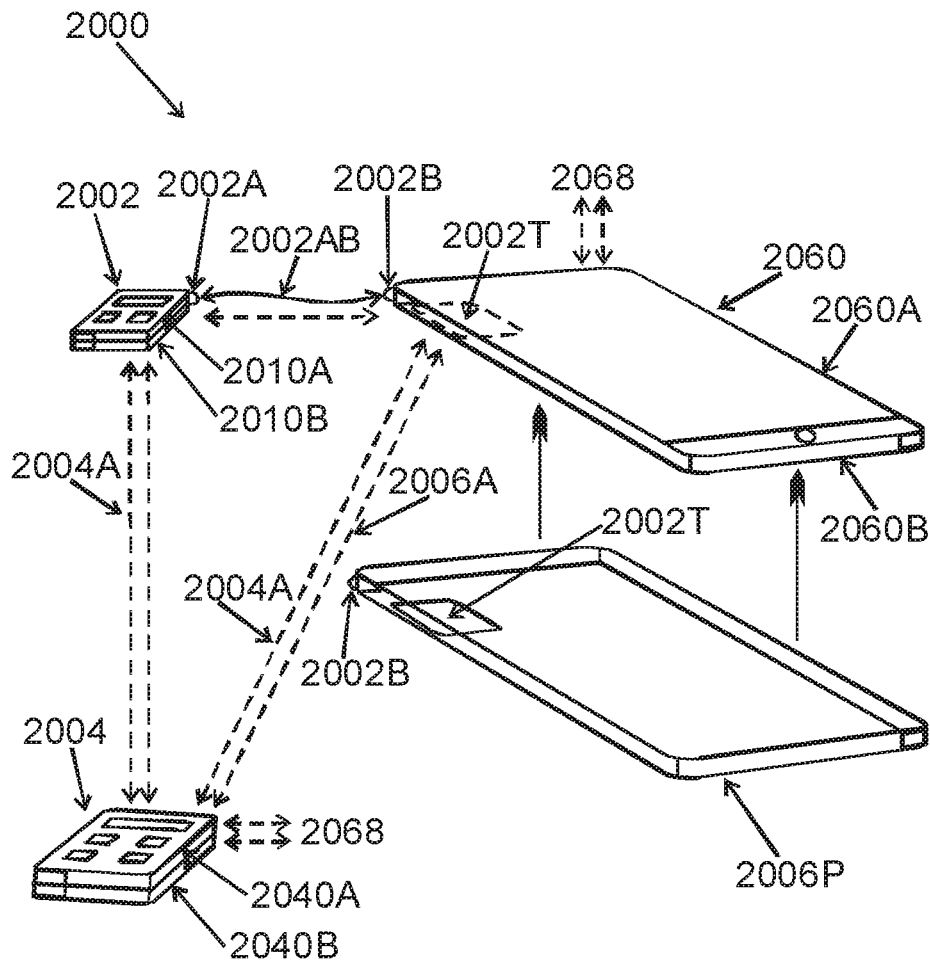
FIG. 1A is a perspective view of the first embodiment of the invention that was shown in FIG. 1.
Figure 2:
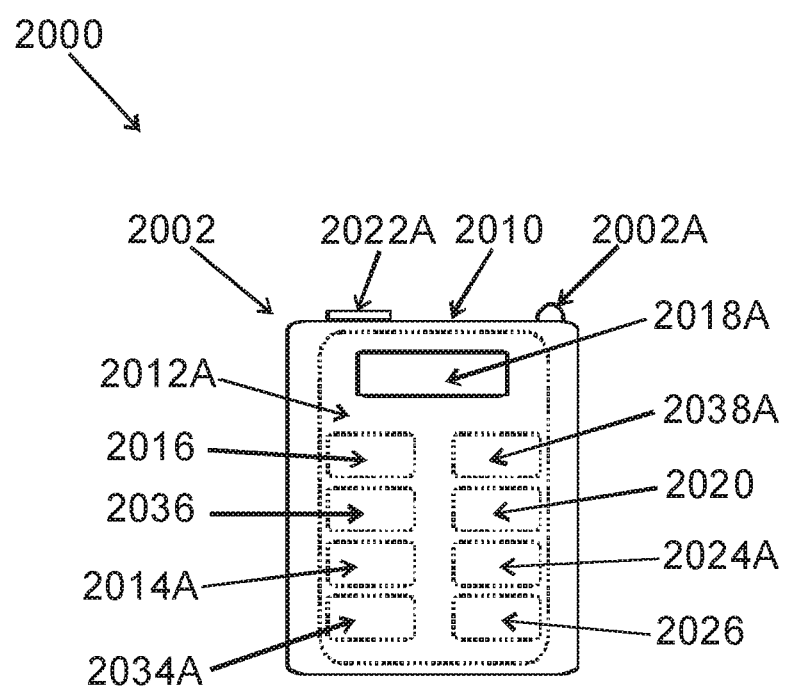
FIG. 2 is a front view of one wireless signal sender/locator unit in accordance with the invention.

FIG. 2 shows the wireless signal sender/locator unit 2002 that includes a shell unit 2010, a wireless signal sender unit 2016, a speaker/sound unit 2020, a sensor unit 2026, a wireless signal receiver unit 2036, a circuit board 2012A with a microchip, a battery unit 2014A, a display unit 2018A, a switch unit 2022A, a memory unit 2024A, a microphone unit 2034A, a CPU unit 2038A, and a fastening bar unit 2002A. The shell unit 2010 includes as shown in FIG. 1A a top part 2010A and a bottom part 2010B joined together with any kind of joint method, such as a screw joint, a clip-in joint, a cover seal, etc.

The wireless signal sender unit 2016 can be any kind of wireless electrical signal sender, laser signal sender, non-harmful radiation or radio wave signal sender, light signal or transmitter, a short-wave UHF radio wave transmitter such as a BLUETOOTH® signal sender, wireless microchip, Wi-Fi sender, GPS, or any other kind of wireless signal sender. The wireless signal sender 2016 has a wireless signal connection and communication 2004A, as shown in FIGS. 1 and 1A, to or from the wireless signal operation unit 2004 in order to locate or show distance, direction, or situation or to remind a user where the wireless signal sender/locator 2002 is.

There are many ways for the wireless signal sender unit 2016 to send wireless signals to the wireless signal operation unit 2004. Preferably, a wireless intermittent signal sending method is used in order to save energy of the battery unit 2014A. Operating the wireless signal intermittently is less demanding on the battery, so that the battery energy life is longer. For example, the intermittent time for sending wireless signals can, as shown in FIGS. 1C and 1CC, be adjustably set at 5, 10, or 15 seconds each time or be set at 0 seconds if needed.

Figure 1:
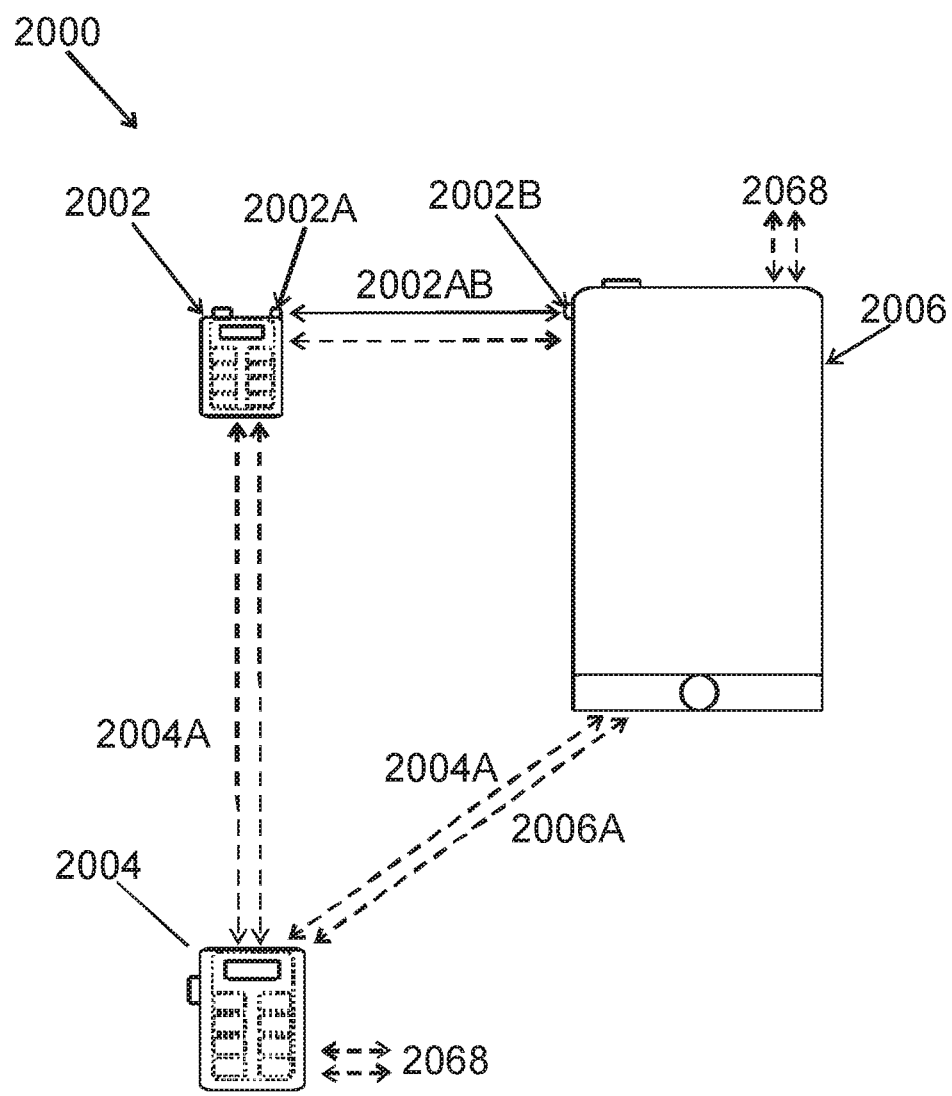
FIG. 1 is a diagram of a mobile device reminder/controller system according to the invention in a first embodiment.

The wireless signal sender/locator 2002 must be physically connected to the mobile device 2006, e.g. with a physical connection method 2002AB as shown in FIGS. 1 and 1A.

The physical connection method 2002AB between the signal sender/locator unit 2002 and the mobile device 2006 can be any kind of fastening method through one connection unit 2002A at the signal sender/locator unit 2002 and another connection unit 2002B at the mobile device 2006, such as any kind of fastener, hook/bar, hole/clip, chain, tie, string, cable, rope, cord, clip, key, etc., and can be attachable or detachable. The fastener unit 2002A can be designed or structured at any location of the wireless signal sender/locator unit 2002.

Alternatively, the connection method 2002AB can be independent or separate through a wireless or remote controller, etc.

The signal sender/locator unit 2002 can be directly attached or stuck on the mobile device 2006, preferably on the back side of the mobile device 2006 or on the back side of the outside separate shell or cover unit 2006P (see FIG. 1A) of the mobile device 2006. There may be an attachment unit 2002T with any location on the back side of the device 2006 and/or the cover unit 2006P.

The signal sender/locator unit 2002, as a transmitter or a transceiver, can have any kind of design, shape, material, method, function, and structure, and can especially be designed as a mini-decoration item, such as a brooch, a badge, a pin, an animal, a flower, a tiny toy, a key chain, a watch, a ring, a bracelet, a necklace, a patch, a button, a remote controller, an earphone, etc.

The signal sender/locator unit 2002 can have any kind of wearable system, function, structure, format or attachment, and can be attachable and/or detachable.

Figure 3:
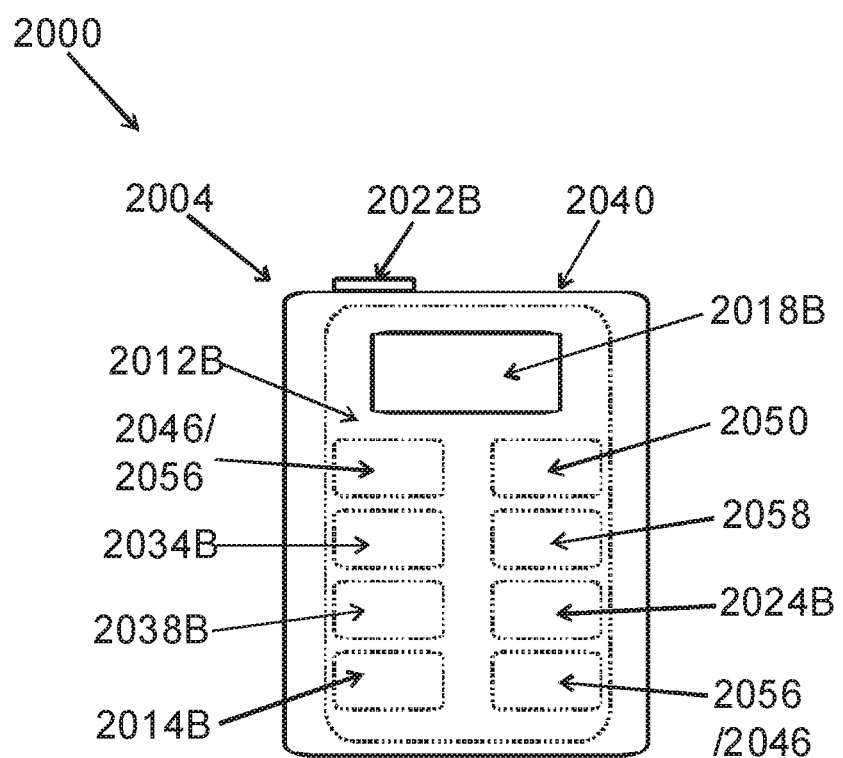
FIG. 3 is a front view of one wireless signal operation unit in accordance with the invention.

FIG. 3 shows that for one embodiment the wireless signal operation unit 2004 includes a shell unit 2040, a wireless signal receiver unit 2046, a speaker/sound unit 2050, a sensor unit 2056, a wireless signal sender unit 2058, a circuit board 2012B with a microchip, a battery unit 2014B, a display unit 2018B, a switch unit 2022B, a memory unit 2024B, a microphone unit 2034B, and a CPU unit 2038B with a microchip. The shell unit 2040 includes, as shown in FIG. 1A, a top part 2040A and bottom part 2040B that are joined together by any kind of joining method, such as a screw connection, a clip-in connection, a cover seal, etc.

The memory unit 2024B can store data such as system threshold values such as a threshold signal strength value or a threshold distance value. The CPU unit 2038B is, for example, programmed to compare a received signal strength or distance determined with a stored threshold signal strength value or a threshold distance value and to cause the notification device, e.g. the speaker/sound unit 2050, to perform a notification when the signal strength is below the threshold signal strength value or the distance is above the threshold distance value.

The operation CPU unit 2038A is in some embodiments programmed to determine the distance between the locator unit and the operation unit in that the sensor unit 2056 senses a signal strength of the wireless signal received by the receiver 2046, the memory unit 2024B stores a relation of signal strengths to distances, and the operation CPU unit 2038A, using the signal strength and the relation, determines the distance.

The signal operation unit 2004 has the following functions:

- receiving, sensing, and processing wireless signals from the signal sender/locator unit 2002 to display, report, or generate an alarm regarding the location, distance, and/or direction of the sender/locator unit 2002 through the wireless connection and communication 2004A;
- sensing wirelessly the location, distance, direction, situation, and/or function of the sender/locator unit 2002 to display, report, alarm, react, adjust, or operate on preset or self-select programs or commands automatically;
- sensing wirelessly and directly the location, distance, direction, situation, and/or function of the mobile device 2006 to display, report, alarm, react, adjust, and/or operate on preset or self-select programs or commands automatically, especially and preferably, operating wirelessly on available functions of the mobile device 2006 through the wireless connection and communication 2004A/2006A;
- operating wirelessly or via a cable connection on functions of the mobile device 2006 with the wireless web network 2068 together; and
- operating all at the same time, same situation, and same speed.

The wireless network 2068 can be the internet, a cellular phone network, Wi-Fi, a satellite network, GPS, a cable network, etc. In some embodiments, a processor of an outside computer can help the locator unit and the operation unit determine the distance between the locator unit and the operation unit.

The signal operation unit 2004 has any kind of design of input and output, command, and operation structures, functions, and components, such as a display screen, a touch screen or a key panel input, an on/off/selection switch, an arrow key, etc. The wireless operation unit 2004 may, for storage purposes, work with the attachment unit 2002T with any location on the back side of the device 2006 and/or the cover unit 2006P, attachably or detachably.

The wireless signal receiver unit 2046 is to receive the wireless signals from the sender/locator unit 2002. The signal sensor unit 2056 is to sense the wireless signals from the sender/locator unit 2002 and/or wireless signals from the mobile device 2006 to detect the location, distance, situation, direction, function, and/or operation signals and data including incoming phone calls, emails, and messages for the wireless signal sender unit 2002 and/or the mobile device 2006 together at the same time. Also, the sensor unit 2056 can be used for sensing and detecting any call, email, message, communication, the battery level, the wireless signal level, a safe mode, a use mode, a situation mode, etc. among the signal sender unit 2002 and/or the mobile device 2006 at the same time. The CPU unit 2038B with a microchip works with the signal receiver unit 2046 and the signal sensor unit 2056 together to process and analyze those signals to obtain information results for the user's reviews, inputs, decisions, operations, and controls. Those information and data results include locations, positions, distances, directions, situations, functions, operations, reminder functions, GPS/Map functions, safety issues, password issues, double sure security, bill and payment functions, personal ID functions, display functions, input functions, touch screen functions, In-Air operation functions, intelligent reaction functions, and AI/VR/MR/Holography, etc.

The wireless signal sender/locator unit 2002 and the wireless signal operation unit 2004 can sense, detect, locate, and communicate with each other to work together in one way, two ways, or multiple ways at the same time.

The wireless signal operation unit 2004 and the mobile device 2006 can sense, detect, process, locate, and/or communicate with each other to work together in one way, two ways, or multiple ways at the same time.

The mobile device 2006 is in use always fastened or attached with the wireless signal sender/locator unit 2002 together at the same time.

Therefore, the signal operation unit 2004, the signal sender unit 2002, and the mobile device 2006 can sense, detect, process, locate, communicate and work together in one way, two ways, or multiple ways/directions at the same time.

The wireless signal receiver unit 2046 and wireless signal sensor unit 2056 can be independent and separate or can be combined into one unit as 2046/2056 with one or multiple microchips. The sensor unit 2056 can contain one or multiple sensors installed inside or can include an in/out plug as a sensor module assembly if needed.

The wireless signal receiver unit 2046 can be any kind of a wireless electrical signal receiver, short-wave UHF radio wave receiver such as a Bluetooth® signal receiver, wireless microchip, Wi-Fi receiver, GPS receiver, or any other kind of wireless signal receiver.

There are many ways in which the wireless signal receiver/sensor unit 2046/2056 can receive and sense wireless signals. Preferably, a wireless intermittent signal is used to receive and sense in order to save energy for the battery unit 2014B. When an intermittent wireless signal is used and the signal is sent less frequently, the demand on the battery is reduced and the battery energy life is longer. For example, the intermittent time for wireless signal receiving and sensing can, as shown in FIGS. 1C and 1CC, be adjustably set at 5, 10, or 15 seconds each time, or be set at 0 seconds if needed.

Once the wireless signal operation unit 2004 senses and finds the location and distance of the wireless signal sender unit 2002 fastened with the mobile device 2006, the operation unit 2004 can generate a notification via its notification device so that the user is reminded to retrieve the mobile device 2006.

All wireless signal frequencies among the wireless signal sender unit 2002, the wireless signal operation unit 2004, and the mobile device 2006 can be preset for auto matching or auto selecting or pairing to operate together at the same time.

All wireless signal wavebands and frequencies among the wireless signal sender unit 2002, the wireless signal operation unit 2004, and the mobile device 2006 must be pre-designed well, e.g. in a one-to-one match or pairing, to avoid wireless signals, wavebands, or frequencies from becoming mixed or interrupted or from interfering with each other.

The wireless signal sender unit 2058 wirelessly sends all outputs and intelligent operations or control commands to the mobile device 2006 and/or the wireless signal sender/locator unit 2002 together at the same time or separately at different times.

The wireless signal sender unit 2058 can be any kind of wireless electrical signal sender, laser signal sender, non-harmful radiation or radio wave signal sender, light signal or transmitter, Bluetooth® signal sender, wireless microchip, Wi-Fi sender, GPS, or any other kind of wireless signal sender.

The wireless signal receiver unit 2046 and the wireless signal sender unit 2058 can be independent or separate or combined into one unit 2046/2058 with one or multiple microchips.

The wireless signal receiver unit 2046 and the wireless signal sender unit 2058 carry out wireless signal connections and communications among the mobile device 2006, the wireless signal operation unit 2004, and the wireless signal sender/locator unit 2002, through wireless signal connection systems 2004A and 2006A at the same time or different times if needed.

The wireless signal connection 2004A/2006A among the signal operation unit 2004, the signal sender/locator 2002, and the mobile device 2006 is important in this mobile device reminder/controller system 2000. By using the signal operation unit 2004 that has wireless signal connections 2004A/2006A with the signal sender/locator 2002 and the mobile device 2006, the user can find and know where and at what location, distance, and direction his or mobile device 2006 is (and signal sender/locator unit 2002 at the same time), because the mobile device 2006 has a physical connection method 2002AB to the signal sender/locator unit 2002. At the same time, the wireless signal sender 2002 sends its wireless signals to the wireless signal operation unit 2004 by using the wireless signal connection 2004A.

The wireless signal connections or communications 2004A/2006A among the mobile device 2006, the wireless signal sender/locator unit 2002, and the wireless signal operation unit 2004 can be any kind of wireless electrical signal, have any electromagnetic wave and frequency with different levels, strengths, formats, shapes, spaces, or modulations, or be any other kind of mobile communication, such as laser signals, light signals or signal transmitters, non-harmful radiation or radio wave signals, Bluetooth® signals, satellite signals, Wi-Fi, GPS, or any kind of cable-free signals, etc. Of course, the wireless signal connections and communications 2004A/2006A are better with Bluetooth® wireless signals or any kind of non-harmful wireless signals for health safety.

The wireless signal connections and communications 2004A/2006A can work through the wireless signal sender units 2016, 2058, 2078, wireless signal receiver units 2036, 2046, 2066, and sensor units 2026, 2056, 2076, in one way, two ways, or multiple ways/directions, partially or entirely, at the same time and speed or at different times and speeds. In other words, the wireless signal connections and communications 2004A/2006A carry and work on all kind of wireless signals for reminding, locating, directing, communicating, and functioning of calls, emails, messages, apps, and webs among the wireless signal sender/locator 2002, wireless signal operation unit 2004, and the mobile device 2006 simultaneously and synchronously.

The wireless signal connections or communications 2004A/2006A among the wireless signal operation unit 2004, mobile device 2006, and the wireless signal sender/locator unit 2002 can be preset, adjusted, switched, touched, or controlled remotely and commanded by a user if needed.

The signal operation unit 2004, as a receiver or a transceiver, can have any kind of design, shape, material, method, function, and structure, and can, for example, be a remote mini controller or device, a key-chain controller, an electrical watch, a hand band, a ring, a patch, one or more buttons, a mini decoration item, wireless earphones and headphones, audio players such as a MP3 player, an MP4 player or an iPod®, etc., video game players such as a PlayStation Vita® or a Nintendo 3DS®, etc.

The signal operation unit 2004 can be any kind of wearable system and have any kind of function, structure, format, or attachment and can be attachable and/or detachable. For example, the signal operation unit 2004 can be configured to be connected to, built into, structured as, or stored with a collar, a shoulder, an arm, a sleeve, a waist, a belt, a button, a pocket inside or outside, a cloth, a purse, a bag or any wearable object and can be attachable and/or detachable.

Figure 4:
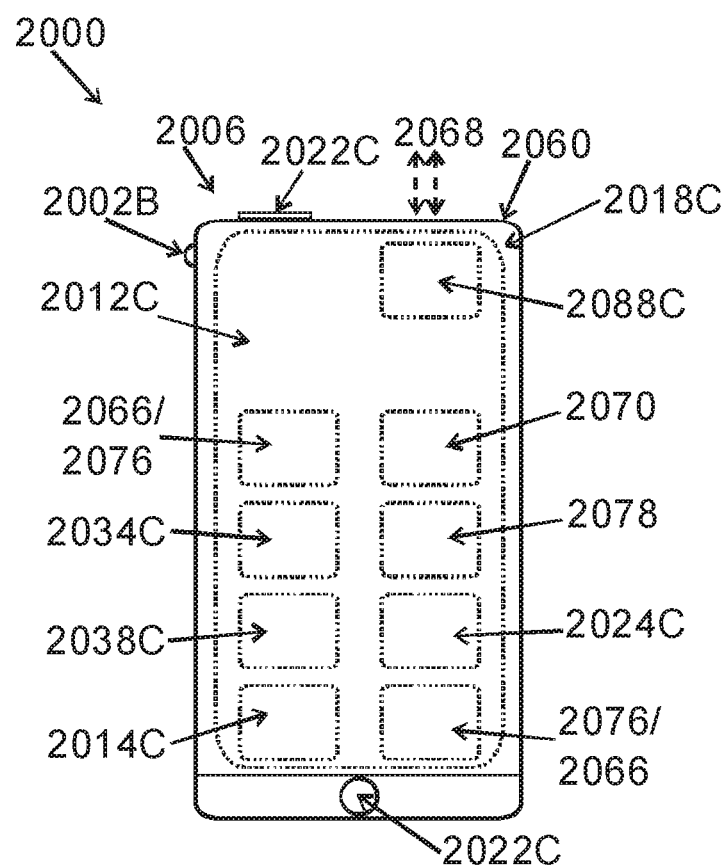
FIG. 4 is a front view of one mobile device in accordance with the invention.

FIG. 4 shows one embodiment of the mobile device 2006 that includes a shell unit 2060, a wireless signal receiver unit 2066, a speaker/sound unit 2070, a wireless sensor unit 2076, a wireless signal sender unit 2078, a circuit board 2012C with a microchip, a battery unit 2014C, a display unit 2018C, a switch unit 2022C, a memory unit 2024C, a microphone unit 2034C, a CPU unit 2038C with a microchip, a fastening bar unit 2002B, and a SIM card unit 2088C. The shell unit 2060 includes, as shown in FIG. 1A, a top part 2060A and a bottom part 2060B that are joined together with any kind of joining method, such as a screw connection, a clip-in connection, a cover seal, etc. An outside separate protection/decoration shell 2006P holds the mobile device 2006. A fastening bar 2002B on the back side of the shell unit 2006P works with the fastening bar 2002A of the signal sender/locator unit 2002. The fastening bar 2002B could alternatively be on any side or location of the shell unit 2006P and/or the mobile device 2006.

The mobile device 2006 can be any kind of mobile electrical device, unit, set, or group, and, for example, can be a cellular phone, an audio player, an iPad®, a personal data device, a notebook, a laptop, a portable device, a mobile controller, etc. Normally, a cellular phone is used as the mobile device 2006. The mobile device 2006 can be any remote device/controller, medical remote device, sport remote device, flight remote device, underwater remote device, game controller/device, Home Intelligent device, AI (Artificial Intelligence) device, VR (Virtual Reality) device, MR (Mixed Reality) device, and Holograph device, etc., in a single unit, multiple units, group, or set, or any combination of these.

The switch unit 2022C can be any kind of switch such as a button, a wheel, a touch screen, and a push button and can include on/off, selection, and input functions.

The physical connection method 2002AB between the mobile device 2006 and the signal sender/locator unit 2002 can be any kind of fastening method through one connection unit 2002A at the signal sender/locator unit 2002 and another connection unit 2002B at the mobile device 2006. For example, the connection can be any kind of fastener such as a hook/bar, hole/clip, chain, tie, string, cable, rope, cord, clip, key, etc.

Alternatively, the connection method 2002AB can be independent or separate through a wireless or remote controller, etc.

The wireless signal sender/locator unit 2002 can also be directly attached or stuck to the mobile device 2006, preferably on the back side of the mobile device 2006 or on the back side of the outside separate shell or cover unit 2006P of the mobile device 2006. In some embodiments, as shown in FIG. 1A, an attachment unit 2002T is on the back side of the device 2006 and/or the unit 2006P.

The mobile device unit 2006, as a transceiver, has any kind of design, system, method, and format of input/output, command, and operation structures, functions, and components. For example, the mobile device 2006 can have a display screen, a touch screen, a key panel input, an on/off/selection switch, an arrow key, audio players, a video game player, etc.

The wireless signal receiver unit 2066 is to receive the wireless signals from the sender/locator unit 2002 and/or the wireless signal operation unit 2004. The signal sensor unit 2076 is to sense the wireless signals from the wireless signal sender/locator unit 2002 and/or from the wireless signal operation unit 2004 to detect the location, distance, direction, situation, function, and operation signals and data for the wireless signal sender unit 2002 and/or wireless signal operation unit 2004 together at the same time. Also, the sensor unit 2076 can be used for sensing and detecting any call, mail, communication, battery level, wireless signal level, safe mode, use mode, situation mode, etc. among the wireless signal sender unit 2002 and/or the wireless signal operation unit 2004 at the same time.

The CPU unit 2038C works with the wireless signal receiver unit 2066 and the signal sensor unit 2076 together to process and analyze those signals and data to obtain information results for the user's reviews, inputs, decisions, operations, and controls. Those information and data results include locations, positions, distances, directions, situations, functions, operations, reminder functions, GPS/Map functions, safety issues, password issues, double sure security, bill and payment functions, personal ID functions, display functions, input functions, touch screen functions, In-Air operation functions, intelligent reaction functions, and AI/VR/MR/Holography, etc.

Therefore, under the mobile device reminder/controller system 2000, the mobile device 2006, the wireless signal operation unit 2004, the wireless signal sender unit 2002, can communicate and work together at the same time.

The wireless signal receiver unit 2066 and the signal sensor unit 2076 may be independent and separate or combined into one unit as 2066/2076. The sensor unit 2076 can contain one or multiple sensors that are installed inside or are installed as an in/out plug of a sensor module assembly if needed.

The wireless signal receiver unit 2066 can be any kind of wireless electrical signal receiver, Bluetooth® signal receiver, wireless microchip, Wi-Fi receiver, GPS receiver, or any other kind of wireless signal receiver.

There are many ways for the wireless signal receiver/sensor unit 2066/2076 to receive and sense wireless signals. Preferably, a wireless intermittent signal is used in order to save energy of the battery unit 2014C. The wireless intermittent time has a longer duration between signals which places less demand on the battery so that the battery energy life is longer. For example, the intermittent time for wireless signal receiving and sensing can, as shown in FIGS. 1C and 1CC, be adjustably set at 5, 10, or 15 seconds each time, or, be set at 0 seconds if needed.

Once the wireless signal operation unit 2004 senses and finds the location, distance, and/or direction of the wireless signal sender unit 2002 fastened with the mobile device 2006, the operation unit 2004 can generate a reminder signal as needed and the user or a helper of the user can find and retrieve the mobile device 2006.

All wireless signal frequency channels (bands) among the wireless signal sender unit 2002, the wireless signal operation unit 2004, and the mobile device 2006 can be preset for automatic matching, automatic selecting, or pairing to operate together at the same time.

The wireless signal wavebands and frequency channels among the wireless signal sender unit 2002, the wireless operation unit 2004, and the mobile device 2006 must be pre-designed well in a one-to-one match or pairing to avoid wireless wavebands or frequency channels from becoming mixed or interrupted or from interfering with each other.

The wireless signal sender unit 2078 wirelessly sends all outputs, intelligent operations, and/or control commands to the wireless signal operation unit 2004 and/or to the wireless signal sender/locater unit 2002 together, separately, or at the same time.

The wireless signal sender unit 2078 can be any kind of wireless electrical signal sender, laser signal sender, non-harmful radiation or radio wave signal sender, light signal or transmitter, Bluetooth® signal sender, wireless microchip, Wi-Fi sender, GPS, or any other kind of wireless signal sender.

The wireless signal receiver unit 2066 and the wireless signal sender unit 2078 carry out wireless signal connections and communications among the mobile device 2006, the wireless signal operation unit 2004, and the wireless signal sender/locator unit 2002 through the wireless signal connection systems 2004A and 2006A at the same time if needed.

The wireless signal connections 2004A/2006A among the mobile device 2006, the wireless signal operation unit 2004, and the wireless signal sender/locator 2002 are important in the mobile device reminder/controller system 2000. By using the mobile device 2006 having the wireless signal connection 2004A/2006A with the wireless signal sender/locator 2002 and the wireless signal operation unit 2004, the user can find and know where and at what location, distance, and direction the mobile device 2006, the wireless signal sender/locator unit 2002, and the wireless signal operation unit 2004 are with respect to each other at the same time, because the mobile device 2006 has a physical connection method 2002AB to the wireless signal sender/locator unit 2002.

The wireless signal connections or communications 2004A/2006A among the mobile device 2006, the wireless signal sender/locator unit 2002, and the wireless signal operation unit 2004 can be any kind of wireless electrical signal and electromagnetic wave and frequency with different levels, strengths, formats, shapes, spaces, and modulations and can be any other kind of mobile communication mode such as laser signals, light signals or signal transmitters, non-harmful radiation or radio wave signals, Bluetooth® signals, satellite signals, Wi-Fi, GPS, or any other kind of cableless signals, etc. Of course, the wireless signal connections and communications 2004A/2006A are better with Bluetooth® wireless signals or any kind of non-harmful wireless signals for health safety.

The wireless signal connection or communication 2004A/2006A among the mobile device 2006, the signal sender/locator 2002, and the signal operation unit 2004 can be preset, adjusted, switched, touched, remotely controlled, and/or remotely commanded by a user if needed.

The mobile device 2006, as a transceiver, can have any kind of design, shape, material, method, function, and structure, with one single device, or multiple devices at the same time or at a different time.

The wireless network 2068 of the mobile device 2006 can be the internet, a cellular phone network, Wi-Fi, a satellite network, a GPS network, etc.

When a user leaves his mobile device 2006 behind at a certain distance, the wireless signal operation unit 2004 senses, detects, and processes wireless signal wave changes (which become weaker and weaker at greater distances) that are sent from the wireless signal sender/locator unit 2002 that has a physical connection method 2002AB to the mobile device unit 2006. At a certain distance wireless signal strength level preset by the user, the signal operation unit 2004 sends out a warning or alarm sound (preferably a beeping or voice sound), a light signal, shock, and/or a vibration signal to alarm and remind the user that he or she has left the mobile device 2006 behind or to notify him or her where or what situation, distance, and direction the mobile device 2006 or user has and the operation status of his or her mobile device 2006. At the same time, the mobile device 2006 can have the above same warning or alarm functions as the wireless operation unit 2004 has for self reminding, self showing, self warning, or self notifying.

The notification device of the operation unit 2004 may generate different levels of the beeping sounds to indicate the distance changes. For example, the beeping or voice sound may be louder or faster as the distance between the wireless signal sender unit 2002 and the wireless operation units 2004 and/or the mobile device 2006 is farther or longer.

At the same time, a user can use the wireless signal operation unit 2004 as a remote control and command center for more intelligent controls on the mobile device 2006 or a group of his mobile devices. The remote controls and commands can include remote starting, automatic secure starting, double secure PW (with both the units 2004 and 2006 having matching PW), double safe pay, remote message reading, writing, or sending for any kind of mail or instant message or Facebook®, remote camera control, sound control, TV control, home utility control, work or office control, etc.

Furthermore, the mobile device reminder/controller system 2000 can be used for any moving object or mobile object purpose, such as baby safety, little child safety, health care safety, animal safety and control, bicycle safety, car safety and control, sport safety, robot safety and control, flying object safety and control, underwater object safety and control, etc.

All units, functions, and structures explained above and shown in FIGS. 1 to 8 may be used, applied, or interexchanged in any figure of this application for all types of controller and remote controller if needed.

Figure 1B:
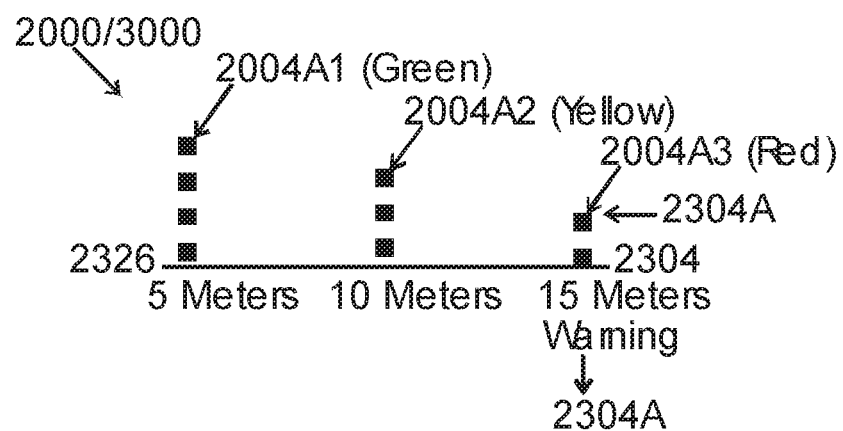
FIG. 1B is a chart of wireless signal waves for one work system, method, or embodiment in accordance with the invention.
Figure 1C:
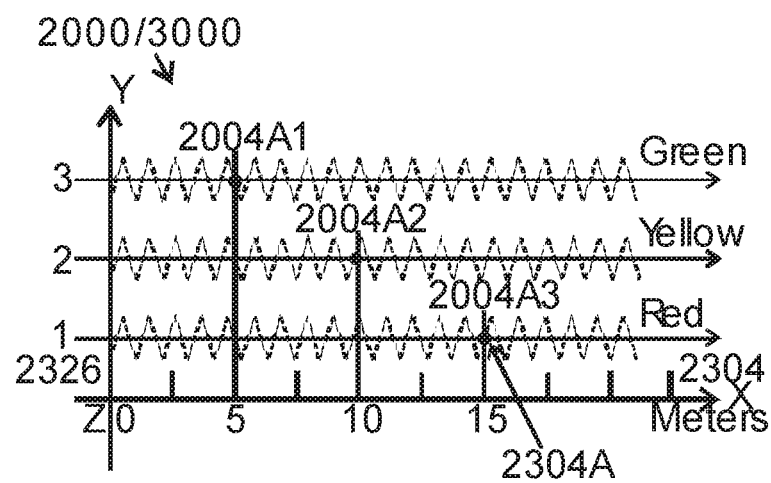
FIG. 1C is another chart of wireless signal waves for another work system, method, or embodiment in accordance with the invention.
Figure 1C:
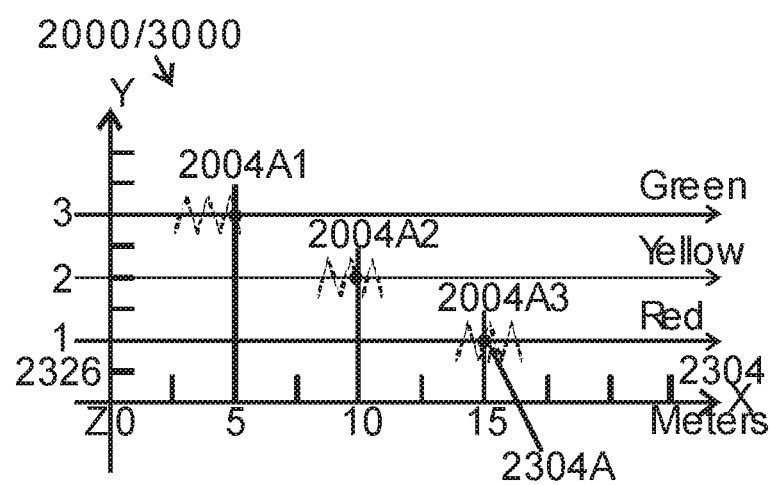

FIG. 1B shows how the wireless signals work under the system 2000/3000. The system can be set up with 5/10/15 meter ranges or 10/20/30 meter ranges for wireless signal strength arrangements or levels between (1) the wireless signal sender/locator unit 2002 fastened with the mobile device 2006 as a sending point 2326 and (2) the wireless signal operation unit 2004 as a receiving/sensing point 2304.

For example, in one embodiment when the wireless signal first strength 2004A1 is at a 5 meters range between the wireless signal sender unit 2002 and the wireless signal receiver unit 2004 and is sensed by the sensor unit 2056, the display light of the wireless signal operation unit 2004 is green, indicating a maximum wireless signal strength level. When the wireless signal second strength 2004A2 is at a 10 meters range sensed by the sensor unit 2056, the display light of the wireless signal operation unit 2004 is yellow. When the wireless signal third strength 2004A3 is at a 15 meters range sensed by the sensor unit 2056, the display light of the wireless signal operation unit 2004 is red, which indicates the weakest wireless signal strength distance level and which can automatically start or set up a warning sound, signal, or sign as the warning/reminding method 2304A. If the wireless signal strength is reduced to a certain low level, is changed to zero, or disappears, the warning 2304A will also be trigged or stated automatically.

There may be some warning 2304A stages if needed, such as a most-urgent warning and a medium-urgency warning with related beeping, voice sound levels, etc.

The sending point 2326 and the receiving/sensing point 2304 can be switched with each other, exchanged, or adjusted and can be intermediated with each other or with other points if needed. The wireless signal sending point 2326 and the wireless signal receiving/sensing point 2304 can be used for distance calculations, situation senses, direction senses, security senses, automatic control senses, automatic operation senses, etc. The wireless signal sending point 2326 and the wireless signal receiving/sensing point 2304 can work with GPS or any kind of location/position system, location finder, distance, direction, position, or situation analysis system, etc.

A user can set up different warning ranges or ways of the ranges 2004A1, 2004A2, and 2004A3 for the wireless signal sender/locator 2002, wireless signal operation unit 2004, and mobile device 2006. For example, a user sets up 30 meters for the third range 2004A3 as the warning start point 2304A. When his mobile device 2006 fastened to or connected to the wireless signal sender/locator unit 2002 is left behind at distance of 30 meters, the wireless signal operation unit 2004 detects the wireless signal strength of the wireless signal sender/locator unit 2002 to be a 30 meter distance level and starts the notification, e.g. the warning sound or light, to remind the user that his mobile device 2006 with the wireless signal unit 2002 has been left behind at a 30 meter distance. The user or a helper of the user can then retrieve the mobile device 2006.

Of course, a user can set up or select any kind of warning range at his or her wish by using selection switch units 2022A/B/C. For example, a user can set up a range of 5/10/15 meters on the units or devices 2002, 2004, and 2006 for warning, reminding, locating, distance, and/or determining direction, or any kind of status or situation.

Furthermore, the wireless signal operation unit 2004 and wireless signal sender/locator unit 2002 (fastened with the mobile device 2006) both can work together, simultaneously and synchronously, to send and/or receive the wireless signals to/from each other, to sense and detect the wireless signal strength at certain meter strength levels, and to start a notification, e.g. a warning sound or light, to remind the user that his mobile device 2006 with the unit 2002 has been left behind.

In other words, the wireless signal sender/locator unit 2002 and wireless signal operation unit 2004 can have the same functions to work together in one way, two ways, or multiple ways at the same time, with the same structure or parts or inside and outside designs, or with different structure or parts or inside and outside designs.

The warning method 2304A can be any kind of warning method, such as a light blinking, a sound beeping or alarming, word speaking, shocking, vibration, etc.

There may be different levels of the beeping sounds to indicate the instant distance changes of the warning method 2304A. For example, the beeping sound being louder or faster can indicate that the distance between the wireless signal sender unit 2002 and the wireless operation units 2004 and/or the mobile device 2006 is longer or greater.

Also, the warning method 2304A can be used for any kind of reminder and alarm for battery level, wireless signal level, appointment, meeting, wake up notification, safety warning, unsafe situation warning, etc.

FIG. 1C shows another work method how the wireless signals work under the system 2000/3000. All wireless signal waves in this embodiment are at the same wave shape, format, and speed at 5/10/15 meter ranges or at 10/20/30 meter ranges for wireless signal wave distances between the wireless signal sender/locator unit 2002 fastened with the mobile device 2006 as a sending point 2326 and a wireless signal operation unit 2004 as a receiving/sensing point 2304. Because gravity has the power to absorb wireless signal waves, as wireless signal waves travel they change from their strongest state and become weaker and eventually become zero, gradually little by little or step by step.

There are 3 levels of the wireless signal wave strength formats. The level 1 is the strongest wireless signal strength meeting at a 5 meters range with the signal first strength 2004A1 sensed by the sensor unit 2056 and causes the display light to be green at the wireless signal operation unit 2004. The level 2 is the wireless signal second strength meeting at a 10 meters range with the signal second strength 2004A2 sensed by the sensor unit 2056 and causes the display light to be yellow at the wireless signal operation unit 2004. The level 3 is the wireless signal weakest strength meeting at a 15 meters distance range as the signal third strength 2004A3 sensed by the sensor unit 2056 causes the display light to be red at the wireless signal operation unit 2004, which is the weakest wireless signal strength distance level and which automatically starts or sets up a warning sound, signal, or sign as the warning method 2304A. If the wireless signal strength is reduced to a certain low level, is changed to zero, or disappears, the warning method 2304A will also be trigged or started automatically.

This wireless signal work method achieves that all wireless signal waves are kept in the same shape, format and speed continuously and consistently without any interruption or intermitting for achieving the most accurate and instant wireless signal sending, receiving, sensing and processing at the wireless signal operation unit 2004, the wireless signal sender/locator unit 2002, and the mobile device 2006. This method also costs most battery energy, however.

FIG. 1CC shows another work method how the wireless signals work under the system 2000/3000. This method is the same as the method shown in FIG. 1C, but instead uses intermittent wireless signal waves. All wireless signal waves are the same wave shape, format, and speed, with intermittent signal times, however, at 5/10/15 meter ranges or 10/20/30 meter ranges for wireless signal wave distances between the wireless signal sender/locator unit 2002 fastened with the mobile device 2006 as sending point 2326 and wireless signal operation unit 2004 as receiving/sensing point 2304. Because of the power of gravity to absorb wireless signal waves, wireless signal waves travel starting from their greatest strength and become weaker and then zero gradually little by little or step by step.

There are also 3 levels of the wireless signal wave strength formats. Each level is with short wireless signal waves by intermittent work shape, format, speed, and time. The level 1 is the wireless strongest signal strength 2004A1 and causes a green light at a 5 meter range, the level 2 is the wireless medium signal strength 2004A2 and causes a yellow light at a 10 meter range, and the level 3 is the 15 meter range when the wireless signal strength 2004A3 is weakest and causes a red light, with the signal strength being sensed by the sensor unit 2056. The weakest signal strength can cause the operation unit 2004 to automatically start or set up a warning sound, signal, or sign as the warning method 2304A. If the wireless signal strength is reduced to a certain low level, is changed, or disappears, the warning 2304A will also be trigged or stated automatically.

This wireless signal work method that uses intermittent signal transmission saves almost half or more of the battery energy power by sending, receiving, sensing, and processing fewer wireless signals at the wireless signal operation unit 2004, the wireless signal sender/locator unit 2002, and the mobile device 2006. The wireless signal sending, receiving, sensing, and processing is, however, less accurate and provides slower results at the wireless signal operation unit 2004.

When the time between the intermittent wireless signals is longer, the battery energy life is longer. For example, the intermittent time for sending wireless signals can be set at 5, 10, or 15 seconds each time or at 0 seconds or adjustable at any seconds if needed.

Figure 1D:
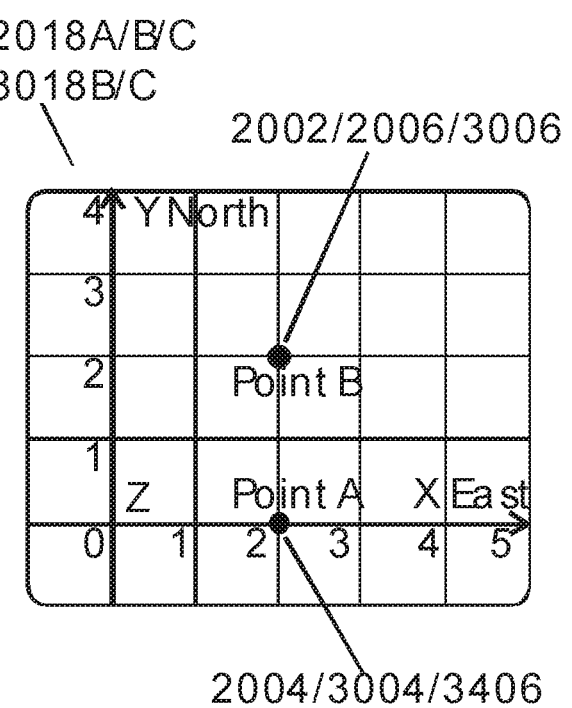
FIG. 1D is a screen display of another work system, method, or embodiment in accordance with the invention.

FIG. 1D shows the display unit 2018A/B/C and 3018B/C and shows another work method of the mobile device reminder/controller system 2000/3000 for alarming and reminding a user of a distance, direction, situation, operation, and function among the units 2002, 2004, and 2006, and 3004/3406 and 3006 at the same time or at a different time.

FIG. 1D shows a coordinate system or frame of axes X, Y and Z. Axis Y is toward the North. Axis X is toward the East. Each section line or mark is calculated as 1 meter. The point A is the location of the wireless signal operation unit 2004/3004/3406. The point B is the location of the wireless signal sender/locator unit 2002/2006/3006 that is sensed and detected by the wireless operation unit 2004/3004/3406. As shown, the point B is at 2 sections north from the point A. This distance of 2 sections means that the wireless signal sender/locator unit and mobile device 2002/2006/3006 are at a distance of 2 meters straight north (upwards on the map) from the wireless operation unit 2004/3004/3406.

Each section line and mark can be adjusted or changed by presetting, automatic setting, or manual setting. The points A and/or B can be adjusted or changed to be moving or still accordingly to a real situation. For example, the points can be adjusted to stay, move slowly or fast at a walking or running speed, or in a moving on a car or subway speed, changing directions, with related time data and situation data, etc. The Axis Z is to use for X-Y-Z axes or 3D dimensional display, function, and operation.

A user can watch the display unit 2018A/B/C and 3018B/C to gain the following information or have the following functions:

The reminders and locations of the mobile device 2006/3006 and/or the units 2002, 2004, 3004, or 3406;

The distances of the mobile device 2006/3006 from the user and/or the units 2002, 2004, 3004, or 3406;

The directions of the mobile device 2006/3006 and/or the units 2002, 2004, 3004, or 3406;

The situations of the mobile device 2006/3006 and/or the units 2002, 2004, 3004, or 3406; and The functions of the mobile device 2006/3006 and/or the units 2002, 2004, 3004, or 3406 that are running.

Furthermore, there are more intelligent functions that can be performed on the display unit 2018A/B/C and 3018B/C with the method and systems 2000/3000. For example, the units 2002, 2004, 2006, 3004, 3006, and 3406 can perform auto recording, previewing data, and analyzing and processing whether all units are in a safe mode or intelligent mode to remind or alarm the user. For example, the beeping or voicing sound level can be increased in strength if a situation in a dark light or an unsafe area or unsafe condition is sensed and detected by the sensor units 2026/2056/2076 and 3056/3076. The sensor units 2026/2056/2076 and 3056/3076 can sense and detect for the point B a distance, situation, location, direction, presence in a dark area or a rain area, movement, or lack of movement in order to set up an alarm, beeping, or other notification to remind the user and to suggest possibilities of how the user should act and which action is best. The units can automatically turn off, switch off, close, automatically operate, automatically command, or automatically control the mobile device 2006/3006/3406 for the user's safety and interest.

Figure 1E:
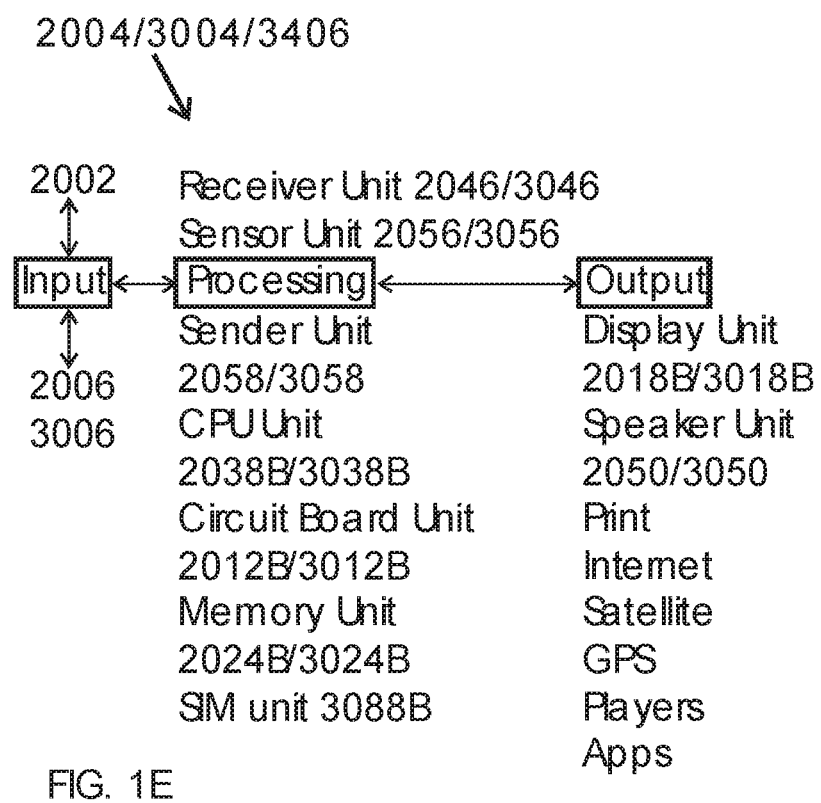
FIG. 1E is a work flow chart of the wireless signal units in accordance with the invention.

FIG. 1E shows a work flow chart of the wireless signal unit 2004/3004/3406 under the mobile device reminder/controller systems 2000/3000. The wireless signal operation units 2004/3004/3406 include an input side, a processing center, and an output side. The input side is to receive all wireless signals from the wireless signal sender/locator unit 2002 and from the mobile devices 2006 and 3006. The processing center is for receiving, sensing, processing, analyzing, and generating results for output from the wireless signals. The output side is to carry out all output results, and can include display units 2018B/3018B, speaker units 2050/3050, printers, Internet transmitter, Satellite transmitter, GPS, Apps, and Players such as audio players, video game players, and mini wireless phone or wire phone, and players for AI/VR/MR/Holography, etc.

The work flow of the input side, processing center, and output side can operate adjustably in one way, two ways, or multiple ways/directions, at the same time or different times if needed.

The processing center normally contains the wireless signal receiver unit 2046/3046, the sensor unit 2056/3056, the wireless signal sender unit 2058/3058, the CPU unit 2038B/3038B, the circuit Board unit with microchip 2012B/3012B, and the memory unit 2024B/3024B, etc.

The methods shown in FIGS. 1B, 1C, 1CC, 1D, and 1E can be applied wholly or partially or mixed into the mobile device reminder/controller systems 2000/3000 for the wireless signal sender/locator unit 2002, the wireless signal operation unit 2004, the mobile device 2006, the wireless signal operation unit 3004/3406, and the mobile device 3006 at the same time or different times, or can be switched or combined with each other.

All sensor units 2026, 2056, and 2076 for the wireless signal sender/locator unit 2002 and for the wireless signal operation unit 2004 and mobile device 2006 can be any kind of sensor such as an accelerometer sensor, a magnetic field sensor, an orientation sensor, a gyroscope sensor, a light sensor, a pressure sensor, a temperature sensor, a proximity sensor, a gravity sensor, a linear acceleration sensor, a rotation sensor, a car sensor, an electrical signal sensor, a wireless signal sensor, a sound sensor, a heart sensor, a blood pressure sensor, a smell sensor, a space sensor, an environment or surrounding sensor, a traffic sensor, a warning sensor, a motion sensor, an outside noise sensor, an inside noise sensor, a direction sensor, a compass sensor, a navigation sensor, a balance sensor, a distance sensor, a visual/eye tracking or control sensor, a sound/mouth tracking or control sensor, and a sensor for an Android® system, an Apple® system, or a Windows® system, or other systems, etc.

The sensor units 2026, 2056, and 2076 can contain one or multiple sensors that are installed inside or are plugged in/out as a sensor module assembly if needed.

All switch units 2022A, 2022B, and 2022C can be any kind of switch, such as a button, a wheel, and a touch screen and can include on/off, selection, and input functions. All display units 2018A, 2018B, and 2018C can be any kind of display and input/output unit, such as a color light indicator, screen display, and a touch screen display with graphic interface (GIF) and can have voice operation functions or key input, arrow, or button inputs, or combinations of these, etc. All battery units 2014A, 2014B, and 2014C can be any kind of battery with any kind of shape, size, and voltage, such as a mini cell, coin, button battery, lithium-ion or lithium battery, rechargeable or non-rechargeable, etc.

Therefore, through FIGS. 1 to 4, the mobile device reminder/controller system 2000 can, for example, be designed, structured, functioned, and operated at three levels:

At the first simplest level, design, or structure, the signal operation unit 2004 is used to remind the user that he or she forgot his phone or the object. The unit 2004 can help the user find the signal sender/locator unit 2002 by setting an alarm and reminding the user of his mobile device 2006 that is fastened with the unit 2002. The signal sender/locator unit 2002 is tied or fastened with the mobile device 2006 together. Once a user finds or is reminded of the location of the signal sender/locator unit 2002, he can also find or be reminded of the mobile device 2006 at the same time.

At the first simplest level, the mobile device reminder/controller system 2000 is with the following structure and system in an economic way:

The signal sender/reminder unit 2002 has a basic function just to send out its wireless signals with certain wireless signal strength ranges and levels, and is fastened with the mobile device 2006 together physically. The basic version of the signal sender/locator unit 2002 can include a shell unit 2010, a wireless signal sender unit 2016, a speaker/sound unit 2020, a circuit board 2012A with microchip, a battery unit 2014A, a display unit 2018A, a switch unit 2022A, and a fastening bar unit 2002A.

The whole shape of the unit 2002 can be designed as a decoration item or a mini attachment, such as a small key chain, a button attachment, a small animal item, a small flower, leaf, or design item, or a combination of these, etc.

The wireless signal operation unit 2004 has a basic function to receive, sense, detect, and process the wireless signals that are sent from the wireless signal sender/locator unit 2002 with certain wireless signal strength ranges and levels to start the notification 2304A, e.g. a warning sound or light, to remind a user that he or she has forgotten the mobile device 2006 and should retrieve it instead of leaving it behind. After receiving the message, the user or a helper of the user will generally retrieve the mobile device 2006 that is physically connected to the locator unit 2002.

The first basic version of the wireless signal operation unit 2004 can include a shell unit 2040, a wireless signal receiver unit 2046, a speaker/sound unit 2050, a sensor unit 2056, a circuit board 2012B with CPU microchip 2038B, a battery unit 2014B, a display unit 2018B, and a switch unit 2022B.

The mobile device 2006 with a fastening bar 2002B can be any kind of mobile device, item, or unit and is preferably a cellular phone or multiple cellular phones.

The physical connection method 2002AB ties, chains or fastens the signal sender/locator unit 2002 with the mobile device 2006 together through fastener units 2002A and 2002B, in an attachable and/or detachable manner. Alternatively, the wireless signal sender/locator unit 2002 can be directly attached or stuck on the mobile device 2006 or on the outside separate shell 2006P of the mobile device 2006. An attachment unit 2002T may help with the direct attachment. In another embodiment, the connection method 2002AB may be via a remote, wireless, or cable connection.

The wireless signal connection 2004A is for the signal operation unit 2004 to receive the signals that are sent from the wireless signal sender/locater unit 2002.

Thus, the mobile device reminder system 2000 is to use the wireless signal receiver/finder unit 2004 to find or to generate reminders to the user to find the wireless signal sender/locator unit 2002 and mobile device 2006 together that have a physical connection method 2002AB with each other. This method uses the wireless signal connection method 2004A in the simplest way.

Furthermore, the mobile device 2006 may include the outside shell 2006P to hold the mobile device 2006 together and may also include the fastener unit 2002B on the outside shell 2006P to fasten with the wireless signal sender unit 2002 through the fastener unit 2002AB.

Therefore, the mobile device 2006 can be fastened with the wireless single sender unit 2002 together.

At a second level of operation, the wireless signal sender unit 2002 and wireless signal operation unit 2004 can work together in one way, two ways, or multiple ways, at a different direction and time or at the same direction and time.

The wireless signal sender/locator unit 2002 is not only to send wireless signals but also to receive the wireless signals from the wireless signal operation unit 2004 and/or mobile device 2006 at the same time, due to the addition of the wireless signal receiver unit 2036 and CPU microchip unit 2038A.

The wireless signal operation unit 2004 from the basic level or version is used but additionally includes the wireless signal sender/locator unit 2058, a memory unit 2024B, and a microphone unit 2034B so that the unit 2004 is used not only for location finding and reminding functions to prevent the user from forgetting the mobile device 2006. Rather, the wireless signal operation unit 2004 is intelligently used further as a mini remote control and command center for location, distance, direction, situation, basic operations and functions of the wireless signal sender/locator unit 2002 and mobile device 2006. For example, the unit 2004 can control, command, or operate an on/off switch, double sure password or any id match check, security alarm, safety functions, message functions, picture functions, payment functions, personal or work functions, social network functions, GPS, internet or wireless or satellite or cell phone communication functions of the wireless signal sender/locator unit 2002 and mobile device 2006, with a remote or wireless or physical connections and communication methods, for the mobile device reminder/controller system 2000 running the wireless signal operation unit 2004, the wireless signal sender/locator unit 2002, and the mobile device 2006 together simultaneously and synchronously.

The second level functions and units include all of the first level functions and units and beyond, with adjustments or modifications or improvements if needed.

At the second level, the mobile device reminder/controller system 2000 is with the following structure and system in relatively economic way:

The wireless signal sender/reminder unit 2002 includes a wireless signal sending function and a receiving function together.

The signal operation unit 2004 includes wireless signal receiving, sensing, detecting, and processing functions.

The mobile device 2006 with a fastening bar 2002B is any kind of mobile device, and is preferably a cellular phone or multiple cellular phones.

Thus, the mobile device reminder system 2000 is to use the wireless signal sender unit 2002 and the wireless signal receiver/finder unit 2004 together for finding or reminding functions and furthermore to operate the wireless signal sender/locator unit 2002 and mobile device 2006 together through the physical or remote connection method 2002AB and wireless signal connection method 2004A/2006A, for multiple operations and function commands and communications at the same time. In other words, the wireless signal sender/locator unit 2002, the wireless signal operation unit 2004, and the mobile device 2006 can work together in one way, two ways, or multiple ways among themselves at different times or at the same time, in a cabled manner and/or in a wireless manner.

At the third level, the signal sender/locator unit 2002 is installed inside or merged into the mobile device 2006. In other words, the mobile device 2006 contains inside of itself all of the same functions and parts of the wireless signal sender/locator unit 2002 that are shown in FIG. 2 and elsewhere.

The wireless signal operation unit 2004, with all related units as is shown in FIG. 3 and elsewhere, is directly to work with the mobile device 2006 for the location finder and reminder functions to find where the mobile device 2006 is and to prevent the user from leaving the mobile device behind. In addition, the wireless signal operation unit 2004 is intelligently used further as mini remote control and command center for location, distance, direction, situation, basic operations and functions of the mobile device 2006. For example, the unit 2004 can be used as remote controller to control, command, or operate an on/off switch, a double sure password or any ID match check, a security alarm, cellular phone calls, safety functions, message functions, picture functions, payment functions, financial functions, personal or work functions, social network functions, GPS, internet, wireless, satellite, or cell phone communication functions of the wireless signal operation unit 2004 and mobile device 2006, with remote or wireless connections and communication methods, for the mobile device reminder/controller system 2000 running the wireless signal operation unit 2004 and mobile device 2006 together at the same time and same speed.

The third level functions and units include all of the first level and second level functions and units and beyond, with adjustments or modifications or improvements if needed.

At the third level, the mobile device reminder/controller system 2000 is with the following structure and system in an economic way:

The wireless signal sender/locator unit 2002 is installed inside the mobile device 2006. In other words, the mobile device 2006 includes or has all units and functions of the wireless signal sender/locator unit 2002 inside. All components, units, parts, and/or structures of the wireless signal sender/locator unit 2002 can be installed inside the mobile device 2006 wholly or partially based on different designs and needs. Alternatively, all components, parts, units, structures, or functions of the wireless signal sender/locator unit 2002 can be merged, adjusted, or combined into the mobile device 2006 inside wholly or partially based on different designs and needs.

The wireless signal operation unit 2004 includes a full range of all previous functions and units, including wireless signal receiving, sending, sensing, detecting, analyzing, processing, operating, controlling, displaying, transferring, auto matching, auto adjusting, and communicating, etc.

The mobile device 2006 is any kind of mobile device and is preferably a cellular phone, or multiple cellular phones, but can be remote devices/controllers, medical remote devices, sport remote devices, flight remote devices, underwater remote devices, game controller/devices, Home Intelligent devices, any device of AI (Artificial Intelligence), or VR (Virtual Reality), MR (Mixed Reality) and Holograph, etc.

The wireless signal connections 2004A/2006A is for the signal operation unit 2004 to receive, send, operate, and communicate the wireless signals between the wireless signal operation unit 2004 and the mobile device 2006 for instruction commands or operations, separately, or running together, remotely and wirelessly, in both directions or multiple ways, at the same time and same pace.

Thus, the mobile device reminder/controller system 2000 is to use the wireless signal receiver/finder unit 2004 to find the units 2002/2006 or to generate an alarm and/or reminder, or furthermore, to operate the mobile device 2006 together through the remote or wireless connection methods 2004A/2006A, for multiple operations and function commands and communications in one, two, or multiple ways/directions.

At the same time, the mobile device reminder/controller system 2000 is to use the wireless signal operation unit 2004 and mobile device 2006 together for intelligent operations and functions, such as for operation on the wireless signal operation unit 2004 and mobile device 2006 directly in one way, two ways, or multi ways/directions simultaneously and synchronously.

The third level of the mobile device reminder/controller system 2000 can include all functions, designs, system, units, and operations of the first level and second level entirely or partially. The second level of the mobile device reminder/controller system 2000 can include all functions, designs, system, units, and operations of the first level entirely or partially.

All wireless signal waveband and frequency channels between the wireless signal operation unit 2004 and the mobile device 2006 can be preset for auto matching or auto selecting or pairing to operate together at the same time.

All wireless signal wavebands and frequency channels between the wireless signal operation unit 2004 and the mobile device 2006 must be pre-designed well in a one-to-one match or pairing to avoid wireless wavebands or frequency channels from becoming mixed or interrupted or from interfering with each other.

All wireless signal intermittent time sets between the wireless signal operation unit 2004 and the mobile device 2006 can be adjustably the same or different according to an auto setting, a presetting, or a user's self setting.

All of the above units may vary in design, shape, structure, system, method, function, location, and/or material if needed to apply into the various embodiments of the mobile device reminder/controller systems 2000/3000 shown in FIGS. 1 to 8.

All units and functions and structures explained above and shown in FIGS. 1 to 8 may be used, applied, or inter-exchanged in any figure and any unit of this application for all types of the controller and remote controller systems 2000/3000 if needed.

Figure 5:
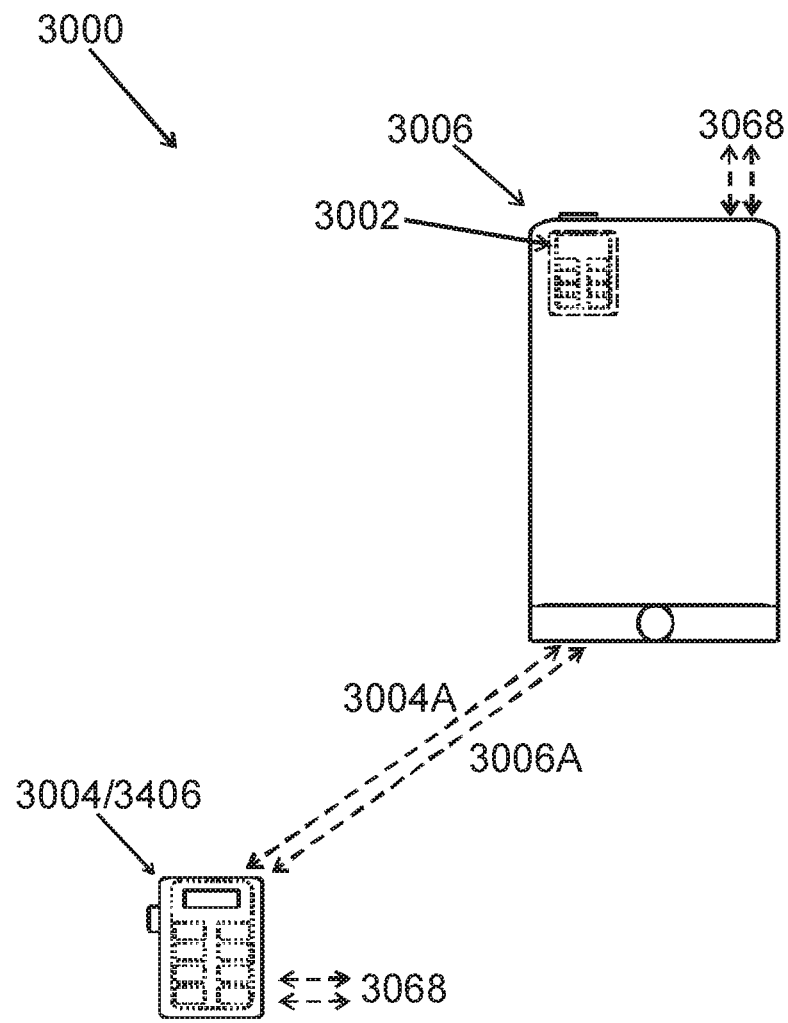
FIG. 5 is a diagram of another embodiment of a mobile device reminder/controller system according to the invention.
Figure 6:
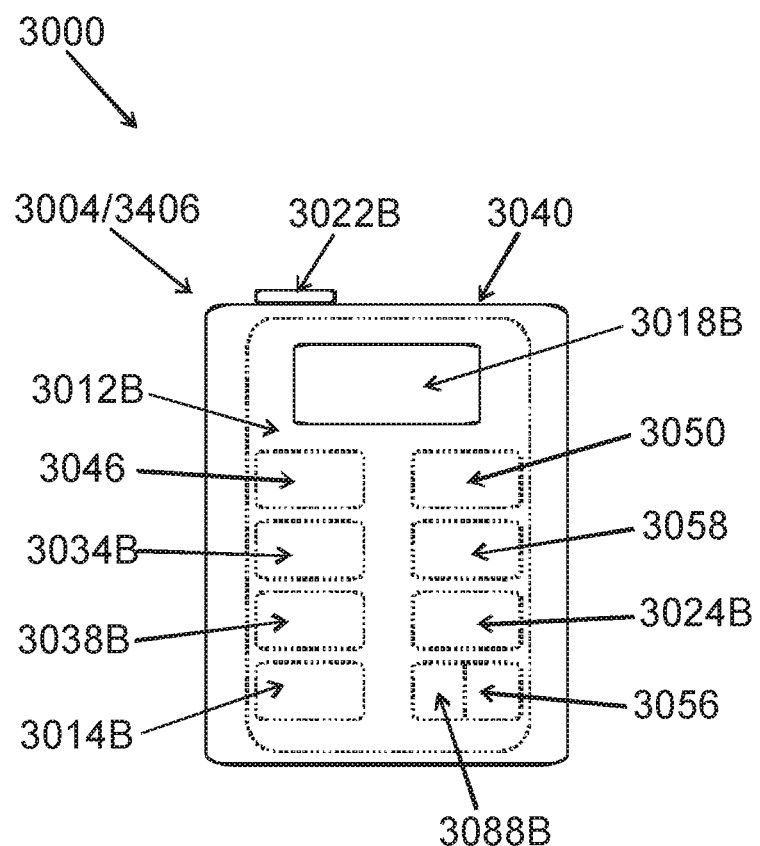
FIG. 6 is a front view of one wireless signal operation unit in accordance with the invention.
Figure 7:
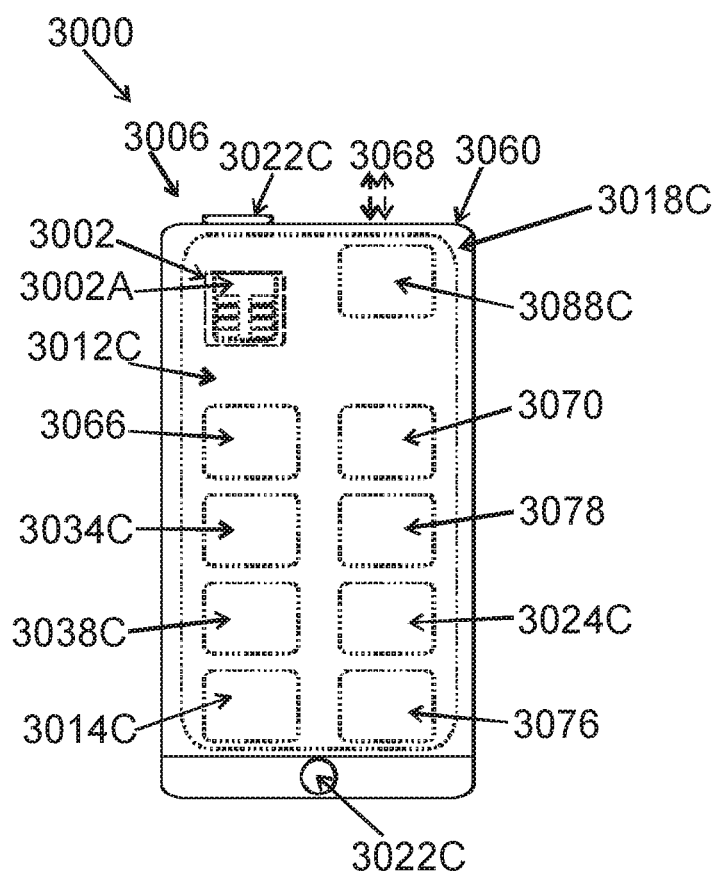
FIG. 7 is a front view of one mobile device in accordance with the invention.

FIGS. 5 to 7 show another mobile device reminder/controller system 3000 that includes the signal operation unit 3004 and the mobile device 3006. The mobile device 3006 includes the wireless signal sender/locator unit 3002, with the unit 3002 being disposed inside the mobile device 3006. The wireless signal sender/locator unit 3002 has the same functions or improvements as the wireless signal sender unit 2002. In other words, the mobile device 3006 has the same functions, units, and operations as the signal sender/locator unit 2002, because the wireless signal sender/locator unit 3002 is installed, merged, improved, or combined inside.

Figure 7A:
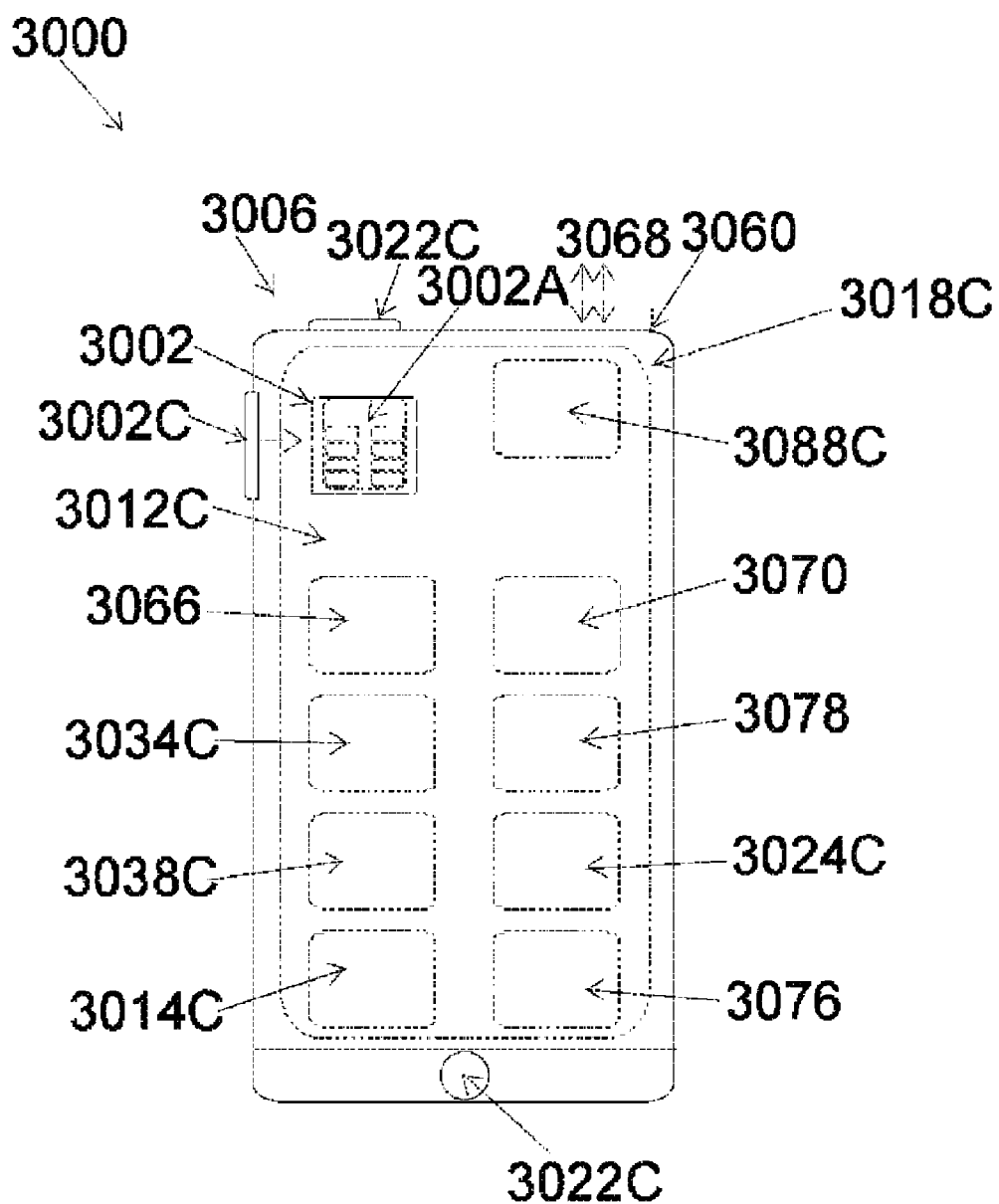
FIG. 7A is a front view of another embodiment of one mobile device in accordance with the invention.

In some embodiments as shown in FIG. 7A, there is a plug-in/out structure unit 3002C designed on the mobile device 3006.

The mobile device 3006 may also in other embodiments merge or combine all parts, units, components, structures, and functions of the wireless signal sender/locator unit 3002 into the units of the mobile device 3006 so that the units, components, parts, structures, and functions are together.

Figure 5A:
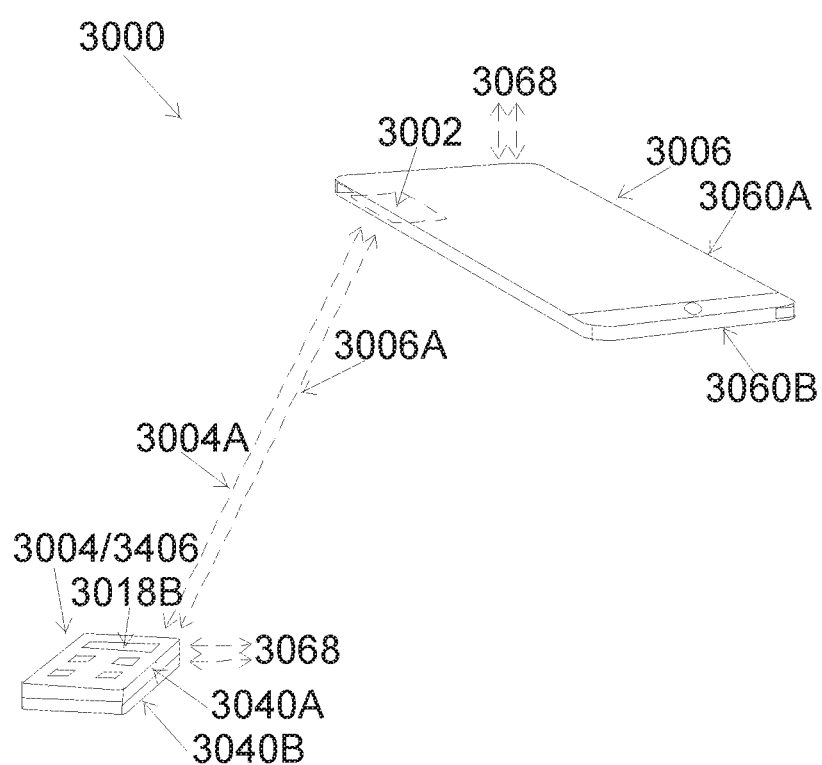
FIG. 5A is a perspective view of the embodiment shown in FIG. 5.

FIG. 7 shows an embodiment of the mobile device 3006 which includes a shell unit 3060, a wireless signal sender/locator unit 3002, a wireless signal receiver unit 3066, a speaker/sound unit 3070, a sensor unit 3076, a wireless signal sender unit 3078, a circuit board 3012C with a microchip, an SIM card unit 3088C, a battery unit 3014C, a display unit 3018C, one or two switch units 3022C, a memory unit 3024C, a microphone unit 3034C, and a CPU unit 3038C with a microchip. The shell unit 3060 includes a top part 3060A and a bottom part 3060B as shown in FIG. 5A.

FIG. 7A shows a similar embodiment of the mobile device 3006 which includes a plug-in/out structure unit 3002C to plug a chip or microchip format unit 3002A into the mobile device 3006, in an attachable and/or detachable manner. The chip or microchip unit 3002A has all of the functions that the signal sender unit 3002 has, but is in a chip or microchip format or structure. The chip or microchip unit 3002A can also have more functions. In other words, the wireless signal sender/locator unit 3002 can be fixed or designed inside the mobile device 3006 to be attachable and/or detachable as a microchip unit 3002A through the plug in/out unit 3002C.

The wireless signal sender unit 3002, the plug-in/out structure unit 3002C, and the microchip unit 3002A may have any kind of a system, structure, format, function, method, and design, etc.

The mobile device 3006 can be any kind of a mobile electrical device, unit, or set, and for example can be from the various types of cellular phones, audio players, iPads®, personal data devices, notebooks, laptops, portable devices, mobile controllers, etc. Normally, a cellular phone is the mobile device 2006. Also, the mobile device 3006 can be from the various types of remote devices/controllers, medical remote devices, sport remote devices, flight remote devices, underwater remote devices, game controller/devices, Home Intelligence devices, any device of AI (Artificial Intelligence), or VR (Virtual Reality), MR (Mixed Reality) and Holograph, etc., in a single unit, multiple units, or group sets, or one or more combinations thereof.

The wireless signal sender/locator unit 3002, plug in/out unit 3002C, chip or microchip unit 3002A, wireless signal receiver unit 3066, wireless signal sender unit 3078, sensor unit 3076, CPU unit 3038C, speaker/sound unit 3070, battery unit 3014C, display unit 3018C, memory unit 3024C, microphone unit 3034C, circuit board 3012C with a microchip, and shell unit 3060 all may include single or multiple units with any kind of design, shape, material, method, function, location, and/or structure.

The wireless signal receiver unit 3066 and wireless signal sensor unit 3076 can be independent and separate or can be combined into one unit as 3066/3076 with one or multiple microchips. The sensor unit 3076 can include one or multiple sensors installed inside or as an in/out plug of a sensor module assembly if needed.

The wireless signal receiver unit 3066 can be any kind of wireless electrical signal receiver, Bluetooth® signal receiver, wireless microchip, Wi-Fi receiver, GPS receiver, or any other kind of wireless signal receiver. Of course, it is first preferable to use Bluetooth® wireless signals or any kind of non-harmful wireless signals for health safety.

The wireless signal sender unit 3078 and wireless signal sender/locator unit 3002 can be a wireless electrical signal sender, a laser signal sender, a non-harmful radiation or radio wave signal sender, a light signal or transmitter, a Bluetooth® signal sender, a wireless microchip, a Wi-Fi transmitter, a GPS transmitter, or any other kind of wireless signal sender. Of course, it is first preferable to use Bluetooth® wireless signals or any kind of non-harmful wireless signals for health safety.

The wireless signal sender unit 3078 can be with the signal sender/locator unit 3002 together as one unit or separate units with the same functions, structure, and designs or with different functions, structures, and designs.

Furthermore, the wireless signal sender/locator unit 3002, the chip or microchip unit 3002A, the wireless signal receiver unit 3066, the wireless signal sender unit 3078, and the sensor unit 3076 can be formed as one unit or as multiple units, as one or multiple microchip units, or separate, combined, or mixed in multiple or several combinations.

The wireless signal sender unit 3078 wirelessly sends all outputs, intelligent operations, or control commands to the wireless operation unit 3004 and the mobile device 3006 together at the same time or separately at different times.

The wireless signal receiver unit 3066 and the signal sender unit 3078 are to carry out wireless signal connections and communications between the mobile device 3006 and the signal operation unit 3004, through wireless signal connection systems 3004A and 3006A in one way, two ways, multiple ways or directions, at the same time or different times if needed.

The wireless signal sender unit 3078 and the wireless signal receiver unit 3066 preferably use Bluetooth® wireless signals or any kind of non-harmful wireless signals for health safety.

The wireless signal operation unit 3004 has its own wireless connection and communication 3004A working with the mobile device 3006 together. Also, the mobile device 3006 has its own wireless connection and communication 3006A working with the wireless signal operation unit 3004 together.

The wireless signal connection 3006A is for the mobile device 3006 to send, receive, sense, operate, and communicate the wireless signals between the mobile device 3006 and the wireless signal operation unit 3004 for instruction commands or operations, running separately or running together, remotely and wirelessly, in one, both, or multiple directions or ways, simultaneously and synchronously.

The wireless signal connections or communications 3004A/3006A between the mobile device 3006 and the signal operation unit 3004 can be any formed via any kind of electrical signal and electromagnetic wave and frequency with different levels, strengths, formats, shapes, spaces, or modulations, or can be any other kind of mobile communication mode, such as laser signals, light signals or signal transmitters, non-harmful radiation or radio wave signals, Bluetooth® signals, satellite signals, Wi-Fi, GPS, or any other kind of wireless signal, etc. Of course, the wireless signal connections and communications 3004A/3006A are better with Bluetooth® wireless signals or any kind of non-harmful wireless signals for health safety.

The wireless signal connections or communications 3004A/3006A among the mobile device 3006 and the wireless signal operation unit 3004 can be preset, adjusted, switched, touched, or remotely controlled and commanded by a user if needed.

The mobile device 3006, as a transceiver, can have any kind of design, shape, material, method, function, system, and structure within one single device, or within multiple devices at the same time or at different times.

FIG. 6 shows that this embodiment of the wireless signal operation unit 3004 includes, for example, a shell unit 3040, a wireless signal receiver unit 3046, a speaker/sound unit 3050, a wireless sensor unit 3056, a wireless signal sender unit 3058, a circuit board 3012B with a microchip, an SIM card unit 3088B, a battery unit 3014B, a display unit 3018B, a switch unit 3022B, a memory unit 3024B, a microphone unit 3034B, and a CPU unit 3038B. The shell unit 3040, as shown in FIG. 5A, includes a top part 3040A and a bottom part 3040B that can be fastened to each other with any kind of joining method, such as a screw connection, a clip-in connection, or a cover seal, etc.

The wireless signal operation unit 3004 can perform the following functions:

receiving, sensing, and processing wireless signals from the mobile device 3006 to display, report, or generate an alarm regarding the location, direction, and/or distance of the mobile device 3006;

sensing wirelessly and directly the location, direction, distance, situation, and/or function of the mobile device 3006 to display, report, generate an alarm, react, adjust, and/or operate on preset or self-selected programs or commands automatically, and especially and preferably operating wirelessly on all available functions of the mobile device 3006; and operating wirelessly or via a cable on all functions of the mobile device 3006 together with the wireless web network 3068, all at the same time, same situation, and same speed.

The wireless network 3068 can be an internet network, a cellular phone network, Wi-Fi, a GPS network, a satellite network, a cable network, etc.

The wireless signal operation unit 3004 has any kind of design of input and output, command, operation structure, function, and component, such as a display screen, a touch screen or key panel input, an on/off/selection switch, an arrow key, etc. The wireless operation unit 3004/3406 may, for storage purposes, be connected with the attachment unit 2002T (see FIG. 1A) with any location on the back side of the device 2006/3006 and/or the cover unit 2006P, in an attachable and/or detachable manner.

The wireless signal receiver unit 3046 is to receive the wireless signals from the sender/locator unit 3002 of the mobile device 3006. The signal sensor unit 3056 is to sense the wireless signals from the sender/locator unit 3002 of the mobile device 3006 to detect the location, distance, direction, situation, function, and operation signals and data including phone calls, emails, and messages for the mobile device 3006 of the reminder function and system 3000. Also, the sensor unit 3056 can be used for sensing and detecting any call, mail, message, communication, battery level, wireless signal level, safe mode, use mode, situation mode, etc. among the signal sender unit 3002 and the mobile device 3006 at the same time. The CPU unit 3038B works with the wireless signal receiver unit 3046 and the signal sensor unit 3056 together to process and analyze those wireless signals and data to obtain information results for the user's review, inputs, decisions, operations, and controls.

Those information and data results include locations, positions, distances, situations, functions, operations, reminder functions, GPS/Map functions, safety issues, password issues, double sure security, bill and payment functions, personal ID functions, display functions, input functions, touch screen functions, In-Air operation functions, and intelligent reaction functions, etc.

Therefore, the wireless signal operation unit 3004 and the mobile device 3006 can work together in one way, two ways, or multiple ways and directions, at the same time and same pace.

The wireless signal receiver unit 3046 and the wireless signal sensor unit 3056 can be independent and separate or can be combined into one unit 3046/3056. The sensor unit 3056 can include one or multiple sensors installed inside or as an in/out plug of a sensor module assembly if needed.

The wireless signal receiver unit 3046 can be any kind of wireless electrical signal receiver, Bluetooth® signal receiver, wireless microchip, Wi-Fi receiver, GPS receiver, or any other kind of wireless signal receiver. Of course, preferably Bluetooth® wireless signals or any kind of non-harmful wireless signals are used to improve health safety.

The wireless signal sender 3058 can be any kind of a wireless electrical signal sender, a laser signal sender, a non-harmful radiation or radio wave signal sender, a light signal or transmitter, a Bluetooth® signal sender, a wireless microchip, a Wi-Fi transmitter, a GPS transmitter, or any other kind of wireless signal sender. Of course, preferably Bluetooth® wireless signals or any other kind of non-harm wireless signals are used for health safety.

The wireless signal receiver unit 3046 and the wireless signal sender unit 3058 can be independent and separate or can be combined into one unit 3046/3058 with one or multiple microchips.

The wireless signal sender unit 3058 wirelessly sends all outputs, intelligent operations, and/or control commands to the mobile device 3006 and wireless operation unit 3004 together at the same time or separately at different times.

The wireless signal receiver unit 3046, the wireless signal sender unit 3058, and the wireless signal sender/locator unit 3002 carry out wireless signal connections and communications between the mobile device 3006 and the wireless signal operation unit 3004, through wireless signal connection systems 3004A and 3006A at the same time if needed.

The wireless signal connection 3004A/3006A among the wireless signal operation unit 3004 and the mobile device 3006 is important in this mobile device reminder/controller system 3000. By using the wireless signal operation unit 3004 having wireless signal connection 3004A/3006A with the wireless signal sender/locator 3002 of the mobile device 3006, the user can find and know at the same time where and what distance his mobile device 3006 is at, so that he or she can retrieve the mobile device 3006 so that the mobile device 3006 is not left behind and/or is not lost.

The wireless signal connections or communications 3004A/3006A among the mobile device 3006 and the wireless signal operation unit 3004/3406 can be any kind of wireless electrical signal, electromagnetic wave, and frequency with different levels, strengths, formats, shapes, spaces, and modulations, or can be any other kind of mobile communication mode such as laser signals, light signals or signal transmitters, non-harmful radiation or radio wave signals, Bluetooth® signals, satellite signals, Wi-Fi, GPS, or any other kind of cableless signals, etc. Of course, the wireless signal connections and communications 3004A/3006A are better with Bluetooth® wireless signals or any kind of non-harmful wireless signals for health safety.

The wireless signal connections and communications 3004A/3006 work through the wireless signal sender units 3058, 3078, wireless signal receiver units 3046, 3066, and sensor units 3056, 3076, in one way, two ways, or multiple ways/directions, partially or entirely, at the same time and speed or at different times and speeds. In other words, the wireless signal connections and communications 3004A/3006A carry and work on all kind of wireless signals for reminding, locating, directing, communicating, and functioning of calls, emails, messages, apps, and webs between the mobile device 3006 and the wireless signal operation unit 3004/3406 simultaneously and synchronously.

The wireless signal connections or communications 3004A/3006A among the wireless signal operation unit 3004/3406 and the mobile device 3006 can be preset, adjusted, switched, touched, or remotely controlled and commanded by a user if needed.

All sensor units 3056 and 3076 can be any kind of sensor, such as an accelerometer sensor, a magnetic field sensor, an orientation sensor, a gyroscope sensor, a light sensor, a pressure sensor, a temperature sensor, a proximity sensor, a gravity sensor, a linear acceleration sensor, a rotation sensor, a car sensor, an electrical signal sensor, a wireless signal sensor, a sound sensor, a heart sensor, a blood pressure sensor, a smell sensor, a space sensor, an environment or surrounding sensor, a traffic sensor, a warning sensor, a motion sensor, an outside noise sensor, an inside noise sensor, a direction sensor, a navigation sensor, a balance sensor, a distance sensor, a compass sensor, a visual/eye tracking or control sensor, a sound/mouth tracking or control sensor, a sensor for an Android® system, an Apple® system, or Windows® system, or any other system, etc.

The sensor units 3056 and 3076 can include one or multiple sensors installed inside or as an in/out plug of a sensor module assembly if needed.

The wireless signal operation unit 3004, as a transceiver, can be any kind of design, shape, material, method, function, system, and structure, such as a remote mini controller, a key-chain controller or device, an electrical watch, hand band, ring, patch, button, mini decoration item, audio player, video game player, wireless earphone or headphone, etc.

The wireless signal operation unit 3004 can be with any kind of wearable system, function, structure, format or attachment, and can be attachable and/or detachable. For example, the wireless signal operation unit 3004 can be configured to be connected to or structured or stored with collars, shoulders, arms, sleeves, waists, belts, buttons, pockets inside or outside, cloth, purses, bags, mini decoration items wearable in an area near the user's ear, or any wearable object, in an attachable and/or detachable manner.

The display units 3018B and 3018C can be any kind of display and input/output unit, such as a color light indicator, a screen display, or a touch screen display with graphic interface (GIF), voice operation functions, keyboard, arrow, or button inputs, or combinations, thereof, etc. The switch units 3022B and 3022C can be any kind of a switch, such as a button, a wheel, and a touch screen, and can have on/off, selection, and/or input functions. All battery units 3014B, 3014C can be any kind of battery with any kind of shape, size, and voltage, such as a mini-cell, coin, button, lithium-ion, lithium, rechargeable or non-rechargeable, etc.

The first level of the wireless operation unit 3004 has, for example, a basic structure and function as follows:
 the shell unit 3040;
 the circuit board 3012B with a microchip;

the battery 3014B;
the micro wireless receiver/sensor unit 3046/3056 to receive and sense the wireless signals from the wireless signal sender unit 3002 of the mobile device 3006;
the switch/selection unit 3022B to switch On/Off and to make selections; and
the speaker unit 3050 to send out a warning sound.

The wireless signal receiver/sensor unit 3046/3056 is only to receive and sense the wireless signal strength from the wireless signal sender unit 3002 of the mobile device 3006.

There are many ways for the wireless signal receiver/sensor unit 3046/3056 to receive and sense wireless signals. Preferably, it uses a wireless intermittent signal to receive and sense in order to save energy of the battery unit 3014B. As the intermittent time between the emissions of wireless signals is longer, there is less demand on the battery and, therefore, the battery energy life is longer. For example, the intermittent time for receiving or sending wireless signals can be adjustably set at 5, 10, or 15 seconds each time, or can be set at 0 seconds if needed as shown in FIGS. 1C and 1CC.

Once the wireless signal operation unit 3004 senses and finds the location and distance of the wireless signal sender unit 3002, it can generate a notification so that the user is reminded to return to retrieve the mobile device 3006.

All wireless signal frequency channels between the wireless signal operation unit 3004 and the mobile device 3006 can be preset for automatic matching or automatic selecting or pairing to operate together at the same time.

All wireless signal wavebands and frequency channels between the wireless signal operation unit 3004 and the mobile device 3006 must be pre-designed well as a one-to-one match or pairing to avoid wireless wavebands or frequencies from becoming mixed or interrupted or interfering with each other.

All wireless intermittent time for sending or receiving wireless signals can be adjustably set at 5, 10, or 15 seconds each time, or at 0 seconds if needed as shown in FIGS. 1C and 1CC, with the times matching each other or being different.

The wireless signal operation unit 3004 can be with any kind of design, function, system, method, structure, format, shape, form, look, and function, etc., such as any wearable item, a mini pin, badge, broach, bracelet, head band, hand band, ring, and button. A user can put this little mini unit 3004 at an area close to the ears, up a front pocket, at a waist band, in a key chain, or in a little pouch. Once the warning sound or notification starts, the user is reminded that he or she has left the mobile device 3006 behind.

Furthermore, in a second level of the invention, by adding, for example, a sensor unit 3056, a wireless signal sender unit 3058, a memory unit 3024B, a CPU microchip unit 3038B, and a microphone unit 3034B, the wireless signal operation unit 3004 has the sensor unit 3056 sense or detect a phone call, email, reminder or clock alarm, or message that is coming to the mobile device 3006 and then sends the alarm to the speaker/sound unit 3050 to send out the warning or alarm to the user.

If a user is in very noisy environment or area and places the cellular phone in his or her pants pockets or bag, he or she may not hear the ring sounds of the cellular phone and may miss incoming calls, emails, and messages. The wireless signal operation unit 3004/3406 can be built with a light weight and mini size. Therefore, a user can put the wireless signal operation unit 3004/3406 designed as a mini wearable item, button, safety pin, or headphone set attachment, etc., at his front-upper pocket, or at his clothing front upper area, or closer to his ears area, to easily let the user hear the ring sounds and be reminded of incoming calls, emails, and messages.

For example, when a cellular phone signal comes to indicate an incoming call, email, or message to the mobile device 3006, the mobile device 3006 receives the cellular phone signal and sends the cellular phone signal to the wireless mini unit 3004/3406 almost at the same time and same speed. The wireless mini unit 3004/3406 receives, senses, detects, and processes the incoming cellular phone signals, and then generates a notification by the speaker unit 3050 for an alarm sound. The notification device of the wireless mini unit 3004 could alternatively generate a light signal, a vibration, or a shock to remind the user of the incoming cellular phone call, email, or message so that he or she will be prompted to go to the mobile device 3006 and take the phone call. For example, the notification device can be one or more of a display, a light, a speaker, a vibrator, and a shocking device.

Once the wireless signal operation unit 3004/3406 sends a notification (as a beep, voice, light, shock, or vibration) to indicate that a phone call, email, or message is incoming, the user is reminded so that he or she will not miss an incoming phone call, email, or message. The notification can be given in different levels for different warnings. For example, the beeping can be emitted faster to generate or indicate a more urgent warning level.

The sensor unit 3056 can sense the wireless signal level, phone call, email, message, battery level, and reminder or clock alarm for the mobile device 3006 and/or wireless operation unit 3004, so that the device 3006 and unit 3004 are working together at the same time.

The wireless signal operation unit 3004/3406 includes a display unit 3018B to show wireless signal levels, battery levels, clock alarms, and phone calls, emails, or messages of the mobile device 3006 and/or the wireless operation unit 3004/3406 itself through the wireless signal connections and communications 3004A/3006A and alarm sound unit 3050 in order to remind the user of battery levels, wireless levels, and clock alarms so that the user does not miss incoming calls, emails, or messages of the mobile device 3006.

Now, under the system 3000, as a third level of the invention, with all related units as shown in FIG. 6 and beyond, the wireless signal operation unit 3004 directly works with the mobile device 3006 for location finder and reminder functions to find where the mobile device 3006 is or to remind the user not to leave the mobile device 3006 behind. Plus, the wireless signal operation unit 3004 is to be used as a mini remote unit 3406 of the mobile device 3006.

More importantly, the wireless signal operation unit 3004 is intelligently used further as a remote control and command center of the mobile device 3006 for location, distance, direction, situation, operations and functions of the mobile device 3006, such as to control, command, or operate an on/off switch, to control a group of mobile devices, to receive phone calls, emails, messages, to provide two-step security for passwords or any ID match and verification, for a security alarm, safety functions, message functions, picture functions, financial functions, payment functions, personal or work functions, social network functions, and internet, wireless, satellite, or cell phone communication functions of the mobile device 3006 and wireless signal operation unit 3004 in one way, two ways, or multiple ways, with remote or wireless connections and communication methods 3004A/3006A, for the mobile device reminder/ controller system 3000 running the wireless signal operation unit 3004 and mobile device 3006 together simultaneously and synchronously.

The structure and function for the third level of the wireless signal operation unit 3004/3406 is, for example, as follows:

- the shell unit 3040;
- the circuit board 3012B with a microchip and a mini CPU;
- the battery unit 3014B with a rechargeable function;
- the micro wireless receiver/sensor unit 3046/3056 to receive and sense the wireless signals from the wireless signal sender unit 3002 of the mobile device 3006 for locations, calls, messages, emails, apps, and audio players, etc.;
- the switch/selection unit 3022B to switch On/Off and to make selections;
- the speaker unit 3050 to deliver sounds and including speakers or earphone or headphone output functions;
- the microphone unit 3034B;
- the display unit 3018B with any kind of screen display or touch screen or key board input functions, or combinations thereof; and
- a SIM card unit 3088B for mobile communications or double SIM cards with the mobile device 3006 together.

There are three reasons to build up the wireless signal unit 3004 as a mini remote unit 3406 of the mobile device 3006. The mini remote unit 3406 becomes a mini cellular phone as part of a twin set with the mobile device 3006.

A first reason is that it is reported that cellular phone wireless signal waves received by the mobile device 3006 may hurt human bodies, brains, or nerves. Some studies have suggested this although not all studies have affirmatively supported the notion. In any event, more human health issues are related to more mobile devices. At the same time, in modern society humans rely and depend on mobile devices more and more, and they almost never leave our hands anymore.

When cellular phones have more and more functions and operate at increasingly fast speeds, the long-distance and wide cover wireless signal waves may become stronger and stronger (high power electromagnetic waves). Some scientists suggest keeping the cellular phones away from human heads about 1 meter for safety. In order to keep the cellular phones away about 1 meter, many users choose to use earphones or headphones with a cable or a short distance wireless connection to receive the sound outputs and effects of the mobile device 3006. The short distance wireless signal waves (low level electromagnetic waves) such as Bluetooth® may be safer to human beings. Earphones and headphones have to hold on to a user's ears or heads and are not easy to hold, put on, or take off.

Therefore, the mini remote unit 3406 of the mobile device 3006, with short wireless signal waves or any safe wireless signal wave such as Bluetooth®, is more convenient, easy, and safe to use or put on front upper pockets for handling or being reminded of phone calls, emails, or messages from the mobile device 3006.

Furthermore, the wireless signal connection and communication 3004A/3006A may contain and carry two kinds of wireless signals: one is high power electromagnetic waves, such as the cellular phone wireless signal waves or bands with high penetrating power and high transmit power; one is low level electromagnetic waves or bands, such as Bluetooth® or similar waves with lower penetrating power and lower transmit power and short transmit distance (around 10 to 30 meters). Obviously, the low level electromagnetic waves are much safer to human beings. Therefore, it is strongly preferable to use the low level electromagnetic waves for the wireless connections and communications 3004/3006A between the wireless signal operation unit/mini remote unit 3004/3406 and the mobile device 3006 as the first reason above, with related functions, structures, methods, systems, and units, components, and parts shown in FIGS. 1 to 8.

Thus, the wireless signal operation unit or mini remote unit 3004/3406 can be adjustable, switchable, or selectable from the high power electromagnetic waves and frequency channels to the low level electromagnetic waves and frequency channels for human health by using the SAFETY mode 5006 as shown in FIG. 8.

Of course, the wireless signal operation unit or mini remote unit 3004/3406 can be adjustably selectable to have the high power electromagnetic waves only to work as one mobile device independently, or to have the low level (safer level) electromagnetic waves only to work with the mobile device 3006 directly, or both at the same time or different times.

A second reason is that the mobile device 3006, such as cellular phones, are being built up bigger and bigger and heavier and heavier because of being loaded to have more functions. It is not convenient for a user to hold big and heavy cellular phone around his or her ears at the side area to take phone calls. Therefore, the mini remote unit 3406 of the mobile device 3006 is more convenient, easy, safe, light, and small to hold close to an area of the user's ear or to put on a front upper pocket for handling or being reminded of phone calls, emails, or messages from the mobile device 3006.

A third reason is that users are reminded so that they do not miss incoming calls, emails, or messages. The users usually put their heavy and large-sized cellular phones into the pants pockets or bags or on someplace a little too far from the users' ears. In a noisy environment, there are many calls, emails, or messages that are missed because the users cannot hear the rings of the cellular phone. The wireless mini unit 3406 with a light-weight and mini size can be easily stored or held at an area as near as possible to the ears to let the user hear the phone call rings easily and remind the user so that he or she does not miss an incoming phone call, email, or message.

Thus, the mini remote unit 3406 is the same as the wireless signal operation 3004, but can have more functions if needed. In other words, the mini remote unit 3406 and the wireless signal operation unit 3004 can be combined into a single device or can be separate or multiple devices.

The mini remote unit 3406 of the mobile device 3006 may have any kind of outside or inside design, parts or units, format, structure, system, method, and functions, with any kind of wearable system, function, structure, format, or attachment, and can be attachable or detachable, all at the same time as the wireless signal operation unit 3004 and beyond.

Of course, the mini remote unit 3406 preferably operates with Bluetooth® wireless signals or any kind of non-harmful wireless signals for health safety.

The third level of the wireless operation unit 3004 includes, for example, all or part of the functions, structures, units, designs, operations, and systems of the first level and second level. The second level of the wireless operation unit 3004 includes, for example, all or part of the functions, structures, units, designs, operations, and systems of the first level.

At the same time, the mobile device 3006 can control all functions or operations of the wireless operation unit 3004 or 3406.

Figure 5B:
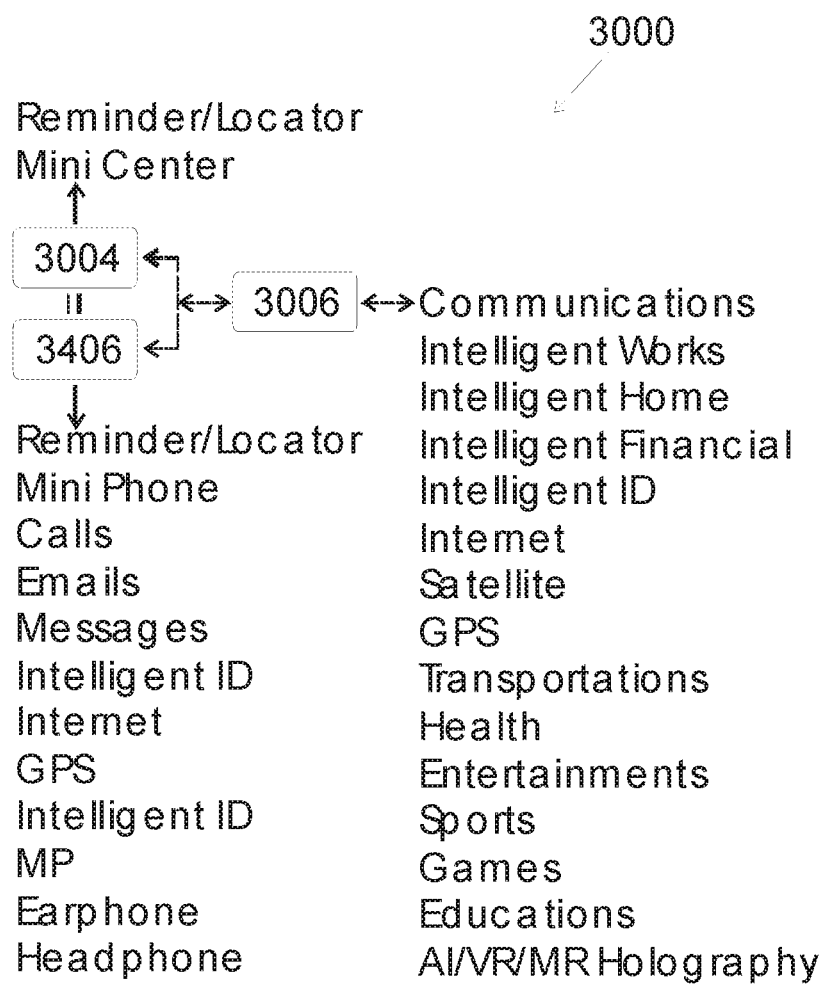
FIG. 5B is a chart of another embodiment of the invention.

FIG. 5B displays a work flow and structure of the mobile device reminder/locator 3000. The wireless signal operation unit 3004 is a mini center for reminding the user of the mobile device 3006 or for locating the mobile device 3006. At the same time, the wireless signal sender/locator unit 3004 can become a mini phone center to have reminder/locator functions and to handle cellular phone calls, emails, messages, internet control, GPS functions, and intelligent ID functions to work with the mobile device 3006.

For example, the mobile device CPU unit 3038C is programmed to cause the mobile device transmitter 3078 to transmit a message signal to the operation unit 3004/3406 as a third wireless signal. The receiver 3046 of the operation unit is configured to receive the message signal. Via the message signal, via the operation CPU unit 3038B, and via the input/output device of the operation unit, the operation unit 3004/3406 is configured to take the telephone call, to answer the text message, the email, or the app message, or to play the reminder or the clock alarm. The wireless signal sender unit 3058 of the operation unit 3004/3406 can send the control signal to the mobile device 3006 so that the operation unit 3004/3406 controls the mobile device 3006 in this embodiment.

In this embodiment, the mobile device 3006 works with the wireless signal operation unit 3004/3406 together for intelligent operation and control system with communications, intelligent works, intelligent home networks, intelligent financial works, intelligent ID systems, entertainment of games, videos, or music playing, sports, internet networks, satellite networks, GPS, transportation, travels, health networks, education, AI/VR/MR/Holography, or robot systems, etc.

The mobile device 3006 becomes an Individual Personal Center working with the wireless signal operation unit 3004/3406 as a key or mini control unit. All mobile devices form a mobile world.

The mobile device reminder/controller system 3000 is built up from the system 2000 and includes, for example, all or part of the components, units, parts, functions, designs, systems, methods, and operations of the system 2000 as was shown in FIGS. 1 to 4 if needed, with the following structure and system:

The wireless signal sender/locator unit 3002 is installed inside the mobile device 3006. In other words, the mobile device 3006 includes or contains all functions of the signal sender/locator unit 3002. All components, units, parts, structures, or functions of the signal sender/locator unit 3002 can be installed inside the mobile device 3006 wholly or partially based on different designs and needs. Alternatively, all components, units, parts, structures, or functions of the signal sender/locator unit 3002 can be merged, adjusted, or combined into the mobile device 3006 structure and system inside wholly or partially based on different designs and needs.

The wireless signal connections 3004A and 3006A are also for the signal operation unit 3004 to receive, send, sense, operate, and communicate the wireless signals between the signal operation unit 3004 and the mobile device 3006 for instruction commands or operations, separately, or running together, remotely and wirelessly, in one or both directions or ways, at the same time.

The mobile device reminder/controller system 3000 uses the signal receiver/finder unit 3004 to find the mobile device or to remind the user to find the mobile device or furthermore, to control and operate one or multiple mobile devices 3006 together through the remote or wireless connection methods 3004A and 3006A, for multiple operations, function commands, and communications.

Furthermore, at the same time, the mobile device reminder/controller system 3000 also uses the mobile device 3006 to work with the signal operation unit 3004 together for intelligent or smart operations, functions, and commands operating on the signal operation unit 3004/3406 and the mobile device 3006 directly in one, two, or multiple directions/ways simultaneously and synchronously.

In that case, the mobile device 3006 and wireless signal operation unit 3004/3406 can be switched or replaced with each other.

For example, the mobile device 3006 can receive, sense, and process the wireless signals that are sent from the wireless signal operation unit 3004/3406 at the adjustable preset or automatically set distance alarm arrangements (e.g. at a distance of 15 meters as is shown in FIG. 1B) to automatically alarm and remind the user to not leave behind the mobile device 3006 or the wireless operation unit 3004/3406 or to not miss incoming calls, emails, clock alarms, and messages.

With the system 3000, a user can use the mobile device 3006 to control, operate, or command the signal operation unit 3004 with the reminding and alarming functions for both the unit 3006 itself and the unit 3004 at the same time or different times. At the same time and same speed, a user can use the wireless signal operation unit 3004 to control, operate, or command the mobile device 3006 in one, two, or multiple directions/ways. In other words, the mobile device 3006 can alarm and remind itself as a self-reminder, and can alarm and remind the user via the wireless signal operation unit 3004/3406 so that the user does not miss incoming calls, emails, and messages, at the same time and does not leave behind the mobile device 3006 when he or she departs. Also at the same time, the mobile device 3006 can be a reminder to the wireless signal operation unit 3004/3406.

Also, with the system 3000, a user can use the mobile device 3006 with the reminding and alarming functions to control, operate, or command any kind of wireless accessory, such as wireless earphones, Bluetooth® earphones, wireless speakers, wireless printers, or wireless controllers, etc., by the mobile device unit 3006 working alone, or with the wireless operation and remote units 3004/3406 working together, at the same time or different times. In that case, the wireless signal sender/locator unit 3002 can be attached on, structured, or installed inside those wireless accessories.

The CPU unit 3038C of the mobile device 3006 can generate a notification signal when the mobile device 3006 receives a message. The signal sender unit 3078 can emit the notification signal as a further wireless signal. The receiver unit 3046 of the operation unit 3004 receives the notification signal. A notification device on the operation unit 3004, such as the speaker/sound unit 3050, performs a notification based on the notification signal after the receiver unit 3046 receives the notification signal.

A user can input information into the operation unit 3004 via the display unit 3018B or via the switch 3022B or via another input device into the operation unit 3004. The input can include controls for controlling the mobile device 3006. The operation unit 3004 is configured to control the mobile device 3006 via transmitting via an operation transmitter 3058 of the operation unit 3004 a control signal 3004A based on the input. The control signal 3004A is transmitted as another wireless signal to control the mobile device 3006 so that the operation unit 3004 remotely controls the mobile device 3006.

The mobile device 3006 and the wireless signal operation unit 3004/3406 can work together for generating alarms or notifications, for reminding, and for controlling each other so that the user is reminded to not leave behind the mobile device 3006 and/or the unit 3004/3406 and to not miss incoming calls, emails, and messages simultaneously and synchronously.

Furthermore, the mobile device reminder/controller system 3000 can be used for any moving object or mobile object purpose, such as baby safety, little child safety, health care safety, animal safety and control, bicycle safety, car safety and control, sport safety, robot safety and control, flying object safety and control, underwater object safety and control, etc.

When the mobile device 3006 is put in a car phone set, the wireless signal operation unit 3004/3406 can be directly used to control, operate, and command the functions and operations between the mobile device 3006 and the car. When the wireless signal operation unit 3004/3406 is put in a car phone set, the mobile device 3006 can be directly used to control, operate, and command the functions and operations between the wireless signal operation unit 3004/3406 and the car. In other words, the wireless signal operation unit 3004/3406, the mobile device 3006, and the car can be intelligently operated and communicated and can command each other in one way, two ways, or multiple ways/directions, simultaneously and synchronously.

The intelligent or smart operations, functions, and commands between the mobile device 3006 and the wireless signal operation unit 3004/3406 may work through the App 5000 as is shown in FIG. 8.

A user can use the App 5000 on the mobile device 3006 to input or set up all functions or operations for sending, commanding, operating, or communicating between the mobile device 3006 and the wireless signal operation unit 3004/3406 that are running together at the same time.

When a user leaves his mobile device 3006 behind or unattended, the wireless signal operation unit 3004 senses, detects, processes, alarms/reminds, and displays the surrounding situations, conditions, distances of the mobile device 3006, etc. Then the wireless signal operation unit 3004 tells or suggests to the user what to do and how to do it best from all kinds of choices.

With preset programs, functions, operations, or requirements on the mobile device 3006, a user can use the wireless signal operation unit 3004 to detect and locate where the mobile device 3006 is, how far away it is, in what situation it is in, how to do something, etc.

For example, if the mobile device 3006 is left behind or lost at a subway car, the wireless signal operation unit 3004 can receive, sense, and process the wireless signals from the lost mobile device 3006 to determine where the subway car is moving or is located, to determine where the stolen mobile device 3006 is, to determine situations and how to lock or report the mobile device 3006, or to indicate that the mobile device 3006 has been returned back to or is located at the office table, etc.

The mobile device 3006 and the wireless signal operation unit 3004/3406 can work together through the connection and communications 3004A/3006A for the following functions and operations and communications and commands: to set up a double Password match, a double security match for payment security and personal financial safety, to perform home remote control, to receive calls or important messages or emails, internet communications or satellite communications, Wi-Fi communications, cellular phone communications, GPS, safety, security, entertainment, sports, etc.

FIG. 8 shows an App system and structure and operation 5000 on the mobile device 3006 that connects, operates, commands, and communicates between the mobile device 3006 and the wireless signal operation unit 3004/3406.

The App system 5000 contains a MAIN MENU 5002 to switch the device on/off, a REMINDER/LOCATOR mode 5004 to remind of and locate the mobile device 3006, a SITUATION/SAFETY mode 5006 to sense, detect, process, alarm and display a surrounding situation, how far away the phone is, if the phone is stolen or left behind, and intelligent suggestions for safety, a PW/ID mode 5008 to double secure the password and ID match between the units 3006 and 3004, a FINANCE mode 5010 to operate financial work for bills, payments, financial activities and transfers, a HOME mode 5012 to remotely control the Home Intelligence including home security, TV, and home utilities, an OFFICE mode 5014 to operate office work, an ENTERTAINMENT mode 5016 to obtain and play music, movies, songs, and games, a SPORT mode 5018 to work on sports, a COMMUNICATION mode 5020 to invoke all kinds of communications in speaking, voice controlling and operating, writing, air waving, calling, emailing, and instant messaging in their formats and functions, and a CAR mode 5022 to control and operate all car operations and car safety functions, etc. The App system 5000 can include an edit function bar 5024 for EDIT, SEND, PRINT, and PLAY functions, etc. Furthermore, the App system 5000 can include the following functions: lock, search, follow up, report, adjust, record, connect, etc.

The SAFETY mode 5006 can also be used for a user to select or adjust the safe wireless signal waves for human health safety. For example, the SAFETY mode 5006 displays a sub-menu containing a list of currently or availably running wireless signal waves for a user to select which one he prefers to use for his health safety concerns. The list includes all currently or availably running wireless signal waves from the high power electromagnetic waves such as the cellular wireless waves to lowest level electromagnetic waves such as Bluetooth® or similar ones for the user to select or adjust which one is better or best to work for the wireless signal connections and communications 3004A/3006A between the mobile device 3006 and wireless signal operation unit 3004/3406. All the same SAFETY mode 5006 can be applied to the wireless operation unit 3004/3406 also.

The PW/ID mode 5008 is to secure the mobile device 3006 with the unit 3004 with double security for the password and ID match functions. For example, if the mobile device 3006 is lost or stolen, no one can unlock or access the mobile device 3006 without the unit 3004 being present to operate, control, or match at the same time. In that case, the unit 3004 becomes a double secure ID key to the mobile device 3006. All the same PW/ID modes 5008 can be applied to the wireless operation unit 3004/3406 also.

Actually, the App system 5000 can work on the mobile device 3006 and wireless operation unit 3004/3406 both together or separately at the same time or different times if needed.

Any of the transmitters can be a short-wave UHF radio wave transmitter such as a Bluetooth® transmitter. Any of the receivers can be a short-wave UHF radio wave receiver such as a Bluetooth® receiver.

All above units mentioned and in FIGS. 1 to 8 may include single or multiple units inside with any kind of design, shape, material, format, method, system, function, location, and structure.

All of the above units may vary in design, shape, structure, system, method, function, location, and material if needed to apply into the various embodiments of the mobile device reminder/controller systems 2000/3000 shown in FIGS. 1 to 8.

All units and functions and structures explained above and shown in FIGS. 1 to 8 may be used, applied, or inter-exchanged in any figure and any unit of this application for all types of the controller and remote controller systems 2000/3000 if needed.

What is claimed is:

1. A method for mobile device management, the method comprising steps of:
    emitting a reminder signal via a transmitter of a locator unit, said locator unit being connected to or disposed in a mobile device, the mobile device comprising a mobile device transmitter and a mobile device CPU unit, the reminder signal being a first wireless signal;
    receiving, via a receiver of an operation unit, said reminder signal;
    determining, via a processor and via said reminder signal, a distance between said locator unit and said operation unit;
    comparing, via an operation CPU unit of said operation unit, said distance with a threshold distance value stored in a memory unit of said operation unit;
    causing, via said operation CPU unit, a notification device of said operation unit to perform a first notification when said distance exceeds said threshold distance;
    emitting a notification signal via said mobile device transmitter when said mobile device receives a message, said notification signal being a second wireless signal;
    receiving, via the receiver of the operation unit, said notification signal; and
    causing, via said operation CPU unit, said notification device to perform a second notification when said receiver receives said notification signal.

2. The method according to claim 1, wherein said operation CPU unit determines said distance between said locator unit and said operation unit in that:
    a sensor unit of said operation unit senses a signal strength of said wireless signal received by said receiver;
    said operation memory unit stores a relation of signal strengths to distances; and
    said operation CPU unit, using said signal strength and said relation, determines said distance.

3. The method according to claim 1, wherein said operation unit is attached to, is built into, or is a member selected from the group consisting of a clothing collar, a shoulder, an arm, a clothing sleeve, a waist, a belt, a button, a pocket, a cloth, a purse, a bag, a wearable object, a remote mini controller or device, a key-chain controller, a watch, a hand band, a ring, a patch, a mini decoration item, a wireless earphone, a wireless headphone, an audio player, and a video game player.

4. The method according to claim 1, further comprising steps of:
    inputting, via an input device of said operation unit, input for controlling said mobile device; and
    controlling said mobile device via transmitting via an operation transmitter of said operation unit a control signal based on said input, said control signal being transmitted via an operation transmitter of said operation unit, said control signal being transmitted as another wireless signal to control said mobile device such that said operation unit remotely controls said mobile device.

5. A mobile device management system comprising:
    a mobile device comprising a mobile device transmitter and a mobile device CPU unit, said mobile device CPU unit being configured to cause said mobile device transmitter to transmit a notification signal as a first wireless signal when said mobile device receives a message;
    a locator unit, said locator unit comprising a transmitter, said locator unit being configured to send a reminder signal as a second wireless signal via said transmitter, said locator unit being configured to be connected to or disposed in said mobile device; and
    an operation unit comprising an operation CPU unit, an operation memory unit, a receiver, a sensor unit, and a notification device, said receiver being configured to receive said notification signal and said reminder signal, a threshold distance value being stored in said operation memory unit;
    wherein said operation CPU unit is configured to use said reminder signal to determine a distance between said locator unit and said operation unit;
    wherein said operation CPU unit is configured to compare said distance with said threshold distance value and to cause said notification device to perform a first notification when said distance exceeds said threshold distance value;
    wherein said sensor unit is configured to recognize said notification signal after said receiver receives said notification signal; and
    wherein said operation CPU unit is configured to cause said notification device to perform a second notification when said sensor unit recognizes said notification signal.

6. The mobile device management system according to claim 5, wherein said transmitter is configured to send at least one wireless signal selected from a group consisting of a laser, non-harmful radiation, a radio wave, light, a microchip signal, Wi-Fi, a GPS signal, an electromagnetic wave, and a satellite signal.

7. The mobile device management system according to claim 5, wherein said notification device comprises at least one member selected from a group consisting of a display, a light, a speaker, a vibrator, and a shocking device.

8. The mobile device management system according to claim 5, wherein said locator unit further comprises a first fastener and is connected to said mobile device via said first fastener; and
    wherein said operation unit is attached to, is built into, or is a member selected from a group consisting of a clothing collar, a shoulder, an arm, a clothing sleeve, a waist, a belt, a button, a pocket, a cloth, a purse, a bag, a wearable object, a remote mini controller or device, a key-chain controller, a watch, a hand band, a ring, a patch, a mini decoration item, a wireless earphone, a wireless headphone, an audio player, and a video game player.

9. The mobile device management system according to claim 8, wherein said first fastener is selected from the group consisting of a tie, a chain, a rope, a clip, a hook, a bar, a string, a cable, a rope, a cord, and a key.

10. The mobile device management system according to claim 5, wherein said locator unit is configured to emit said wireless signal intermittently or continuously from said transmitter.

11. The mobile device management system according to claim 5, wherein said locator unit further comprises a shell unit.

12. The mobile device management system according to claim 11, wherein said shell unit has a form of a member selected from a group consisting of a key chain, a button attachment, an animal, a flower, a leaf, a design, a toy, a mini decoration item, and a combination thereof.

13. The mobile device management system according to claim 5, wherein said operation unit further comprises a display unit.

14. The mobile device management system according to claim 5, wherein said operation unit further comprises an input/output device and an operation transmitter;
   wherein said input/output device is configured to receive input from a user; and
   wherein based on said input said operation CPU unit is configured to generate a control signal and to cause said operation transmitter to transmit said control signal as another wireless signal to control said mobile device such that said operation unit is configured to act as a remote controller of said mobile device.

15. The mobile device management system according to claim 14, wherein said message received by said mobile device is selected from a group consisting of a telephone call, a text message, an email, a reminder, a clock alarm, and an app message;
   wherein said mobile device CPU unit is programmed to cause said mobile device transmitter to transmit a message signal to said operation unit as a third wireless signal;
   wherein said receiver of said operation unit is configured to receive said message signal; and
   wherein via said message signal, via said operation CPU unit, and via said input/output device of said operation unit, said operation unit is configured to take the telephone call, to answer the text message, the email, or the app message, or to play the reminder or the clock alarm.

16. The mobile device management system according to claim 5, wherein said operation CPU unit is configured to determine said distance between said locator unit and said operation unit in that:
   said sensor unit is configured to sense a signal strength of said reminder signal received by said receiver;
   said operation memory unit stores a relation of signal strengths to distances; and
   said operation CPU unit, using said signal strength and said relation, determines said distance.

17. The mobile device management system according to claim 5, wherein said operation unit further comprises a display unit;
   wherein said locator unit further comprises a locator CPU unit, a locator sensor unit, and a locator receiver;
   wherein said locator receiver is configured to receive said notification signal from said mobile device;
   wherein said locator sensor unit is configured to recognize said notification signal after said locator receiver receives said notification signal; and
   wherein said locator CPU unit is configured to cause said transmitter to transmit a further notification signal as a further wireless signal when said locator sensor unit recognizes said notification signal.

* * * * *

UNITED STATES PATENT AND TRADEMARK OFFICE
CERTIFICATE OF CORRECTION

PATENT NO. : 9,961,499 B2  
APPLICATION NO. : 15/471600  
DATED : May 1, 2018  
INVENTOR(S) : Mei et al.

Page 1 of 1

It is certified that error appears in the above-identified patent and that said Letters Patent is hereby corrected as shown below:

On the Title Page

Item (72) inventors should read:
(72) Inventors:  David Mei, Forest Hills, NY (US);  
Jin Xia Bao, Forest Hills, NY (US);  
Eric Mei, Forest Hills, NY (US);  
Yini Li, New York, NY (US)

Signed and Sealed this  
Twenty-fifth Day of September, 2018

Andrei Iancu  
*Director of the United States Patent and Trademark Office*